United States Patent
He et al.

(10) Patent No.: US 9,179,418 B2
(45) Date of Patent: Nov. 3, 2015

(54) APPARATUS AND METHOD OF IMPROVING THE OVERALL DECISION QUALITY OF THE F-DPCH CHANNEL

(71) Applicant: QUALCOMM Incorporated, San Diego, CA (US)

(72) Inventors: Ning He, San Diego, CA (US); Wei Zhang, Santa Clara, CA (US); Ramesh Chandra Chirala, San Diego, CA (US); Sharif Ahsanul Matin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 14/072,229

(22) Filed: Nov. 5, 2013

(65) Prior Publication Data

US 2014/0211694 A1 Jul. 31, 2014

Related U.S. Application Data

(60) Provisional application No. 61/759,261, filed on Jan. 31, 2013, provisional application No. 61/759,266, filed on Jan. 31, 2013.

(51) Int. Cl.
*H04L 1/00* (2006.01)
*H04W 52/24* (2009.01)
(Continued)

(52) U.S. Cl.
CPC ............ *H04W 52/241* (2013.01); *H04W 52/56* (2013.01); *H04W 52/143* (2013.01); *H04W 52/40* (2013.01)

(58) Field of Classification Search
CPC . H04W 52/241; H04W 52/56; H04W 52/143; H04W 52/40

USPC .................... 370/241; 455/69, 522
See application file for complete search history.

(56) References Cited

U.S. PATENT DOCUMENTS

2004/0166884 A1* 8/2004 Oh et al. .......... 455/522
2007/0021139 A1* 1/2007 Baker et al. ......... 455/522
(Continued)

FOREIGN PATENT DOCUMENTS

WO WO-2008100954 A2 8/2008
WO WO-2012135751 A1 10/2012

OTHER PUBLICATIONS $3^{rd}$ Generation Partnership Project; Technical Specification Group Radio Access Network; Radio Resource Control (RRC); Protocol specification (Release 9), 3GPP TS 25.3331 V9.15.0, Jun. 2013.
(Continued)

*Primary Examiner* — Mang Yeung
(74) *Attorney, Agent, or Firm* — Arent Fox LLP

(57) ABSTRACT

Aspects of the methods and apparatus relate to improving the overall decision quality of the Fractional-Dedicated Physical Channel (F-DPCH) channel. One aspect of the methods and apparatus relates to detecting bad channel conditions of a serving base station and improving the serving base station F-DPCH decoding performance in such bad conditions based on the serving base station signal-to interference ratio (SIR) estimation. Another aspect of the methods and apparatus relate to improving the overall decision quality of the F-DPCH channel in soft handover (HO) scenarios by increasing the non-serving base station F-DPCH channel rejections thresholds based on certain SIR estimations. The F-DPCH channel rejections thresholds are based on either the SIR of the non-serving base station, or a difference between non-serving base station SIR and serving base station SIR.

20 Claims, 15 Drawing Sheets

(51) Int. Cl.
*H04W 52/56* (2009.01)
*H04W 52/14* (2009.01)
*H04W 52/40* (2009.01)

(56) References Cited

U.S. PATENT DOCUMENTS

| | | |
|---|---|---|
| 2011/0081940 A1* | 4/2011 | Gerstenberger et al. ...... 455/522 |
| 2012/0195357 A1 | 8/2012 | Chen et al. |
| 2013/0010704 A1* | 1/2013 | Kronquist et al. ............ 370/329 |
| 2013/0034008 A1 | 2/2013 | Kazmi |
| 2013/0072250 A1 | 3/2013 | Zhang et al. |
| 2013/0077519 A1 | 3/2013 | Van Lieshout et al. |
| 2013/0129010 A1 | 5/2013 | Xi et al. |
| 2013/0324179 A1* | 12/2013 | Zhang et al. .................. 455/522 |
| 2013/0324180 A1* | 12/2013 | Zhang et al. .................. 455/522 |

OTHER PUBLICATIONS

Universal Mobile Telecommunications System (UMTS); Physical layer procedures (FDD) (3GPP TS 25.214 version 11.6.0 Release 11), ETSI TS 125 214 V11.6.0, Jul. 2013.

Partial International Search Report—PCT/US2014/014170—ISA/EPO—Apr. 7, 2014, (6 pages).

International Search Report and Written Opinion—PCT/US2014/014170—ISA/EPO—Sep. 2, 2014. (20 total pages).

* cited by examiner

APPARATUS AND METHOD OF IMPROVING THE OVERALL DECISION QUALITY OF THE F-DPCH CHANNEL

CLAIM OF PRIORITY UNDER 35 U.S.C. §119

The present application for patent claims priority to U.S. Provisional Application No. 61/759,261 entitled "APPARATUS AND METHOD OF DOWNLINK TRANSMIT POWER CONTROL THROUGH F-DPCH CHANNEL IN SOFT HANDOVER CONDITIONS" filed Jan. 31, 2013, and assigned to the assignee hereof and hereby expressly incorporated by reference.

The present application for patent also claims priority to U.S. Provisional Application No. 61/759,266 entitled "APPARATUS AND METHOD OF TRANSMIT POWER CONTROL THROUGH F-DPCH CHANNEL IN EXTREME CHANNEL CONDITIONS" filed Jan. 31, 2013, and assigned to the assignee hereof and hereby expressly incorporated by reference.

BACKGROUND

Aspects of the present disclosure relate generally to wireless communication systems, and more particularly, to methods and apparatus for improving the overall decision quality of the F-DPCH channel based on the channel conditions of a base station, thereby providing consistent service in a wireless communication system.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In a typical wireless communication environment, RF signal transmissions between a base station (e.g., NodeB in UMTS) and user equipment (UE) are subject to degradation, such as path loss, shadow fading and multipath, which typically caused by such factors as terrain contours (e.g., mountains, forests), environment (e.g., urban or rural), propagation medium (dry or moist air), changes in distance between a base stations and a mobile UE, etc. A transmit power of the UE is typically controlled by downlink (DL) Transmit Power Control (TPC) commands that are sent from the NodeB to the UE through a downlink (DL) channel. The UE decodes these DLTPC bits (e.g., where a "0" represents a "down" or reduce power command, and a "1" represents and "up" or increase transmit power command) and adjusts the transmit power accordingly. DLTPC can be carried in either a regular Dedicated Physical Channel (DPCH), or a Fractional-DPCH (F-DPCH) channel which constitutes only DL TPC symbols.

When the F-DPCH channel is used, downlink power control may be adopted on the serving base station F-DPCH to warrant a desired level of decoding performance of the DL TPC bits of the base station. The UE may request a change in downlink transmission power by sending uplink (UL) TPC commands on an uplink to the serving base station. The transmission of ULTPCs on the uplink to the base station and the receiving of DLTPCs on the downlink from the base station may be referred to as a power control loop.

In an aspect where the UE has a power-controlled channel from a serving base station but is experiencing bad channel conditions, the F-DPCH power control may not work properly to warrant a desired level of DLTPC decoding performance. In other words, in bad channel conditions such as severe path loss and/or fading, the serving base station may not be able to transmit the F-DPCH channel (and consequently the DLTPC bits) with a power required for reliable reception by the UE, as the base station may already be transmitting at a maximum DL power or the base station could not hear UE's DL power request due to a bad uplink. In these cases, the channel decoding performance at the UE may not be maintained at a desired level, and the decoding error rate may be very high. This results in bad DL power control and difficulties to retain UL/DL connections.

In another aspect, since non-serving base station F-DPCH channels are not power controlled, their DL TPC decoding performance is not protected from channel variations. As such, in bad channel conditions, this may lead to large amount of DLTPC decoding errors for non-serving base stations DLTPC, and thus an inaccurate decision after combining with serving base station DL TPC. Again, this results in bad DL power control and difficulties to retain UL/DL connections.

Thus, aspects of this apparatus and method for to improving the overall decision quality of the F-DPCH channel based on the channel conditions of a serving base station and a non-serving base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the methods and apparatus relate to improving the overall decision quality of the F-DPCH channel is provided. One aspect of the methods and apparatus relates to detecting bad channel conditions of a serving base station and improving the serving base station F-DPCH decoding performance in such bad conditions based on the serving base station signal-to interference ratio (SIR) estimation. Another aspect of the methods and apparatus relate to improving the overall decision quality of the F-DPCH channel in soft handover (HO) scenarios by increasing the non-serving base station F-DPCH channel rejections thresholds based on certain SIR estimations. The non-serving base station F-DPCH channel rejections thresholds are based on either the SIR of the non-serving base station, or a difference between non-serving base station SIR and serving base station SIR.

A method for improving the overall decision quality of the F-DPCH channel is provided. The method includes receiving a downlink (DL) transmit power control (TPC) command on a Fractional-Dedicated Physical Channel (F-DPCH) from a base station and determining a scaling adjustment for a DLTPC rejection threshold for the base station based on channel conditions of this or all base stations. Additionally, the method includes adjusting the DLTPC rejection threshold for the base station based on the determined scaling adjustment. Furthermore, the method includes rejecting or accepting the DLTPC command from the base station based on the adjusted DL TPC rejection threshold.

In another aspect, an apparatus for improving the overall decision quality of the F-DPCH channel is provided. The apparatus includes a processor configured to receive a DL TPC command on a F-DPCH from a base station and determine a scaling adjustment for a DLTPC rejection threshold for the base station based on channel conditions of this or all base stations. Additionally, the processor is configured to adjust the DLTPC rejection threshold for the base station based on the determined scaling adjustment. Furthermore, the processor is configured to reject or accept the DLTPC command from the base station based on the adjusted DL TPC rejection threshold.

In another aspect, an apparatus for improving the overall decision quality of the F-DPCH channel is provided that includes means for receiving a DL TPC command on a F-DPCH from a base station and means for determining a scaling adjustment for a DLTPC rejection threshold for the base station based on channel conditions of this or all base stations. Additionally, the apparatus includes means for adjusting the DLTPC rejection threshold for the base station based on the determined scaling adjustment. Furthermore, the apparatus includes means for rejecting or accepting the DLTPC command from the base station based on the adjusted DL TPC rejection threshold.

In yet another aspect, a computer-readable media for improving the overall decision quality of the F-DPCH channel is provided that includes machine-executable code for receiving a DL TPC command on a F-DPCH from a base station and determining a scaling adjustment for a DLTPC rejection threshold for the base station based on channel conditions of this or all base stations. Additionally, the code may be executable for adjusting the DLTPC rejection threshold for the base station based on the determined scaling adjustment. Furthermore, the code may be executable for rejecting or accepting the DLTPC command from the base station based on the adjusted DL TPC rejection threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents. Furthermore, in the subject disclosure, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Generally, as discussed above, when an F-DPCH channel is used for communication between a UE and a NodeB, downlink power control may be adopted on a base station NodeB F-DPCH to warrant a desired level of decoding performance for the DLTPC bits of the base station. In an aspect, where the UE has a power-controlled channel from a serving base station but is experiencing bad channel conditions, the F-DPCH power control may not work properly to warrant a desired level of DLTPC decoding performance. In another aspect, since non-serving NodeB F-DPCH channels are not power controlled, their DLTPC decoding performance may not protected from channel variations leading to an undesired level of DLTPC decoding errors for non-serving NodeBs DL TPC, and thus an inaccurate decision after combining with serving NodeB DLTPC.

Thus, aspects of this apparatus and method are for improving the overall decision quality of the F-DPCH channel by rejecting unreliable downlink transmit power control commands based on the channel conditions of a serving base station and a non-serving base station.

Figure 1:
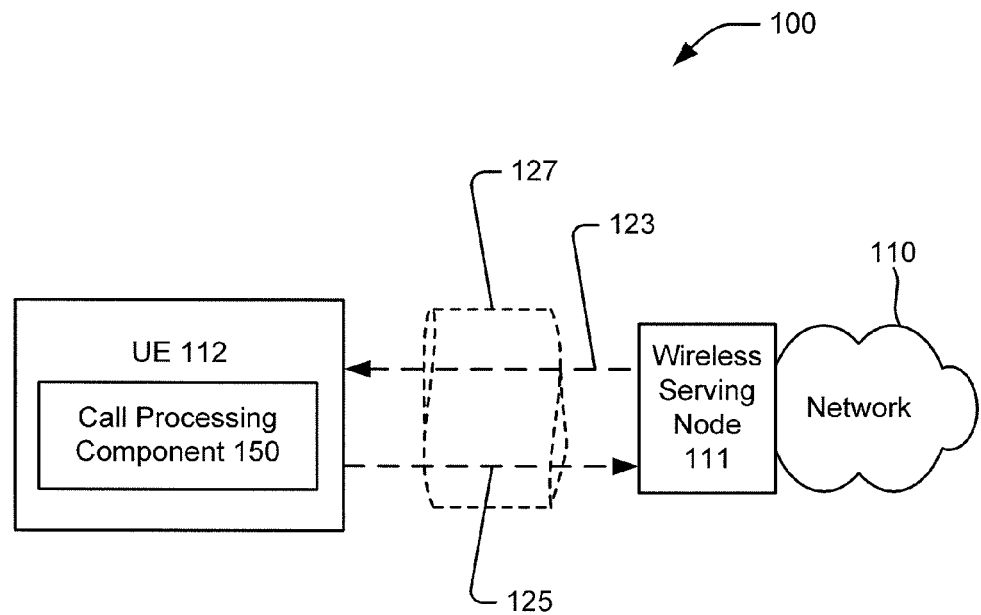
FIG. 1 is a schematic diagram illustrating an example aspect of call processing in a wireless communication system.

Referring to FIG. 1, in one aspect, a wireless communication system 100 is configured to facilitate transmitting vast amount of data from a mobile device to a network. Wireless communication system 100 includes at least one UE 112 that may communicate wirelessly with one or more network 110 via serving nodes, including, but not limited to, wireless serving node 111 over one or more wireless link 127. The one or more wireless link 127, may include, but are not limited to, signaling radio bearers and/or data radio bearers. Wireless serving node 111 may be configured to transmit one or more signals 123 to UE 112 over the one or more wireless link 127, and/or UE 112 may transmit one or more signals 125 to wireless serving node 111. In an aspect, signal 125 and signal 123 may include, but are not limited to, one or more messages, such as transmitting a data from the UE 112 to network 110 via wireless serving node 111.

UE 112 may comprise a mobile apparatus and may be referred to as such throughout the present disclosure. Such a mobile apparatus or UE 112 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more wireless nodes, including, but not limited to, wireless serving node 111 of wireless communication system 100, may include one or more of any type of network component, such as an access point, including a base station or node B, a relay, a peer-to-peer device, an authentication, authorization and accounting (AAA) server, a mobile switching center (MSC), a radio network controller (RNC), etc. In a further aspect, the one or more wireless serving nodes of wireless communication system 100 may include one or more small base stations, such as, but not limited to a femtocell, picocell, microcell, or any other small base station.

Figure 2:
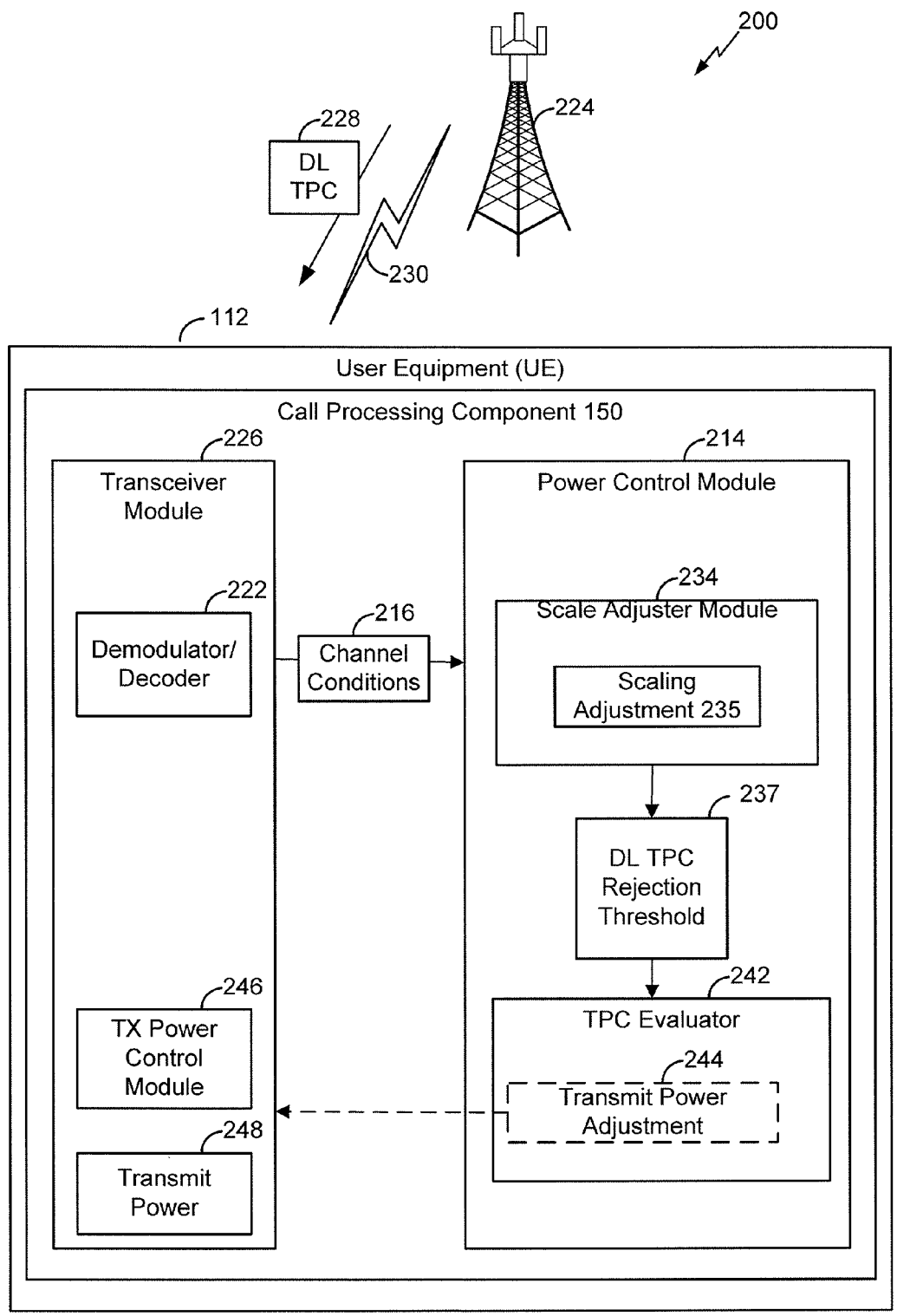
FIG. 2 is a block diagram illustrating an overall aspect of a system including a UE configured for rejecting unreliable DLTPC commands.

Referring to FIG. 2, in an aspect, a wireless communication system 200 (referred to as wireless communication system 100 in FIG. 1) includes a UE 112 having a power control module 214 configured to reject unreliable DLTPC commands 228 from a base station(s) (e.g., Node Bs) 224 based on the channel conditions 216 of the bases station 224.

In an aspect, call processing component 150, residing in UE 112, includes a transceiver module 226 in addition to power control module 214. Transceiver module 226 may include radio frequency (RF) circuitry for sending/receiving RF signals to/from base stations (e.g., Nodes B), such as base station 224. Particularly, transceiver module 226 is operable to receive DL TPC commands, such as DLTPC command 228 from base station 224, on downlink (DL) channel 230, which is a F-DPCHs. The transceiver module 226 includes a demodulator/decoder 222, which demodulates and decodes DLTPC command 228. For example, each DLTPC command usually includes a bit (e.g., where a "0" represents a "down" or reduce power command, and a "1" represents and "up" or increase transmit power command) to indicate an adjustment in transmit power of UE 112.

Indeed, transceiver module 226 forwards the decoded DLTPC command 228 and/or the channels conditions 216 of base station 224 to the power control module 214, which is configured to control transmitting power of UE 112 based on the received DLTPC command 228. For example, after transceiver module 226 receives DLTPC command 228 on a F-DPCH from base station 224 and decodes the DLTPC command 228, transceiver module 226 transmits the channel conditions 216 of base station 224 to power control module 214.

In another aspect, power control module 214 includes a scale adjuster module 234 for determining a scaling adjustment for a DLTPC rejection threshold 237 for base station 224 based on channel conditions 216 of base station 224 and adjusting the DLTPC rejection threshold 237 for the base station 224 based on the determined scaling adjustment 235. For example, after power control module 214 receives the channel conditions 216 of base station 224, scale adjuster module 234, residing in power control module 214, determines a scaling adjustment 235 for a DLTPC rejection threshold 237 for base station 224 based on channel conditions 216 of base station 224 and adjusts DLTPC rejection threshold 237 for base station 224 based on the determined scaling adjustment 235.

Additionally, UE 112 includes a TPC evaluator module 242 configured for rejecting or accepting the DLTPC command 228 from the base station 224 based on the adjusted DLTPC rejection threshold 237. For example, after determining and adjusting DLTPC rejection threshold 237 for base station 224, TPC evaluator module 242 rejects or accepts DLTPC command 228 transmitted from base station 224 based on the adjusted DLTPC rejection threshold 237 when making a combined transmit power adjustment 244. Thereafter, transmit power control module 246 of UE 112 adjusts a level of transmit power 248 according to transmit power adjustment 244.

Figure 3:
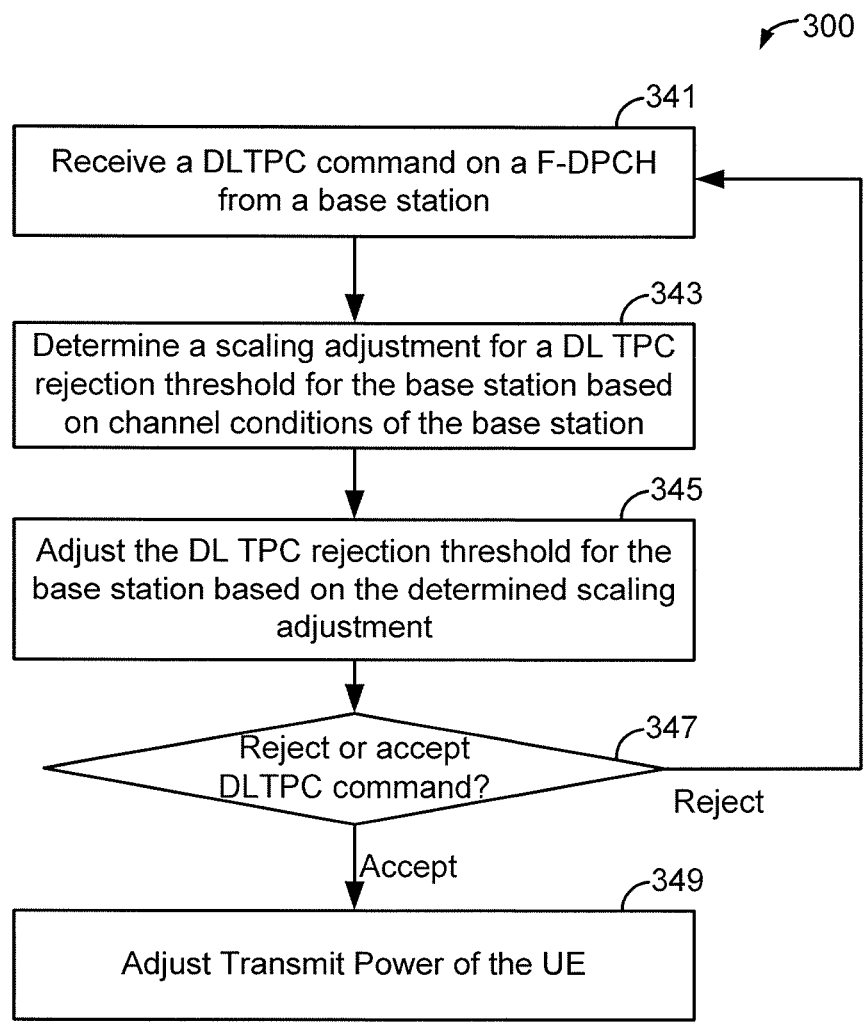
FIG. 3 is a flow chart of the overall aspect of a methodology for rejecting unreliable DLTPC commands.

Referring to FIG. 3, in an aspect, an example methodology 300 for rejecting unreliable DLTPC commands includes, at 341, the UE receiving a DLTPC command on a F-DPCH from a base station. For example, as discussed above with reference to FIG. 2, transceiver module 226 receives DLTPC command 228 on a F-DPCH from base station 224.

At 343, UE 112 determines a scaling adjustment for a DLTPC rejection threshold for the base station based on channel conditions of the base station. For example, after transceiver module 226 receives DLTPC command 228 on a F-DPCH from base station 224, scale adjuster module 234, residing in power control module 214, determines a scaling adjustment 235 for a DLTPC rejection threshold 237 for base station 224 based on channel conditions 216 of base station 224.

At 345 UE 112 adjusts the DLTPC rejection threshold for the base station based on the determined scaling adjustment. For example, after scale adjuster module 234 determines a scaling adjustment 235 for a DLTPC rejection threshold 237 for base station 224 based on channel conditions 216 of base station 224, scale adjuster module 234 also adjusts DLTPC rejection threshold 237 for base station 224 based on the determined scaling adjustment 235.

At 347, UE 112 rejects or accepts the DLTPC command from the base station based on the adjusted DLTPC rejection threshold. For example, after scale adjuster module 234 adjusts DLTPC rejection threshold 237 for base station 224 based on the determined scaling adjustment 235, TPC evaluator module 242 rejects or accepts DLTPC command 228 transmitted from base station 224 based on the adjusted DLTPC rejection threshold 237 when making a combined transmit power adjustment 244.

At 349, transmit power control module 246 of UE 112 adjusts a level of transmit power 248 according to transmit power adjustment 244.

Figure 4:
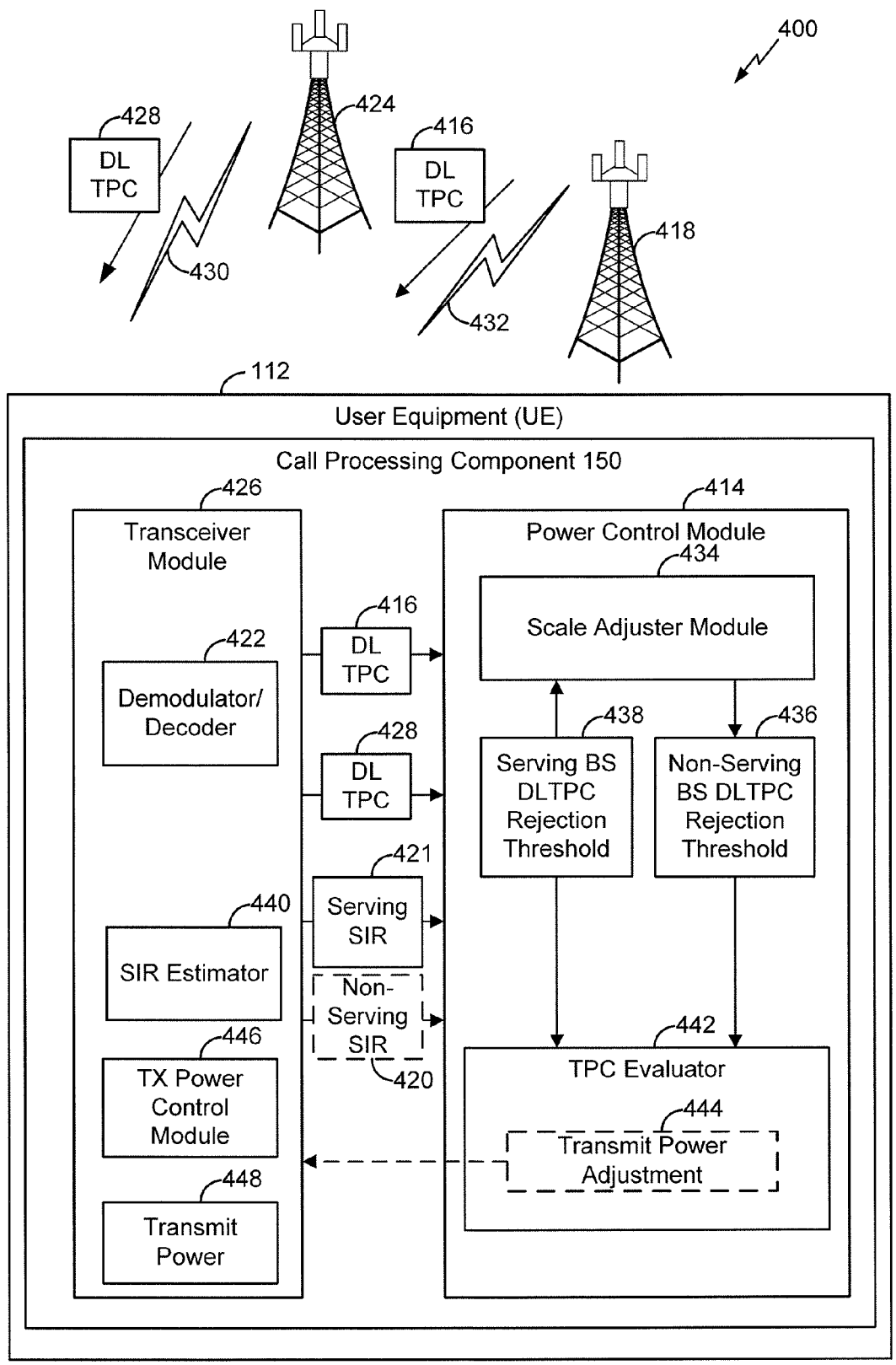
FIG. 4 is a block diagram one aspect of a system including a UE configured for rejecting unreliable DLTPC commands.

Referring to FIG. 4, in an aspect, a wireless communication system 400 (referred to as wireless communication system 100 in FIG. 1) includes a UE 112 having a power control module 414 configured to reject unreliable DLTPC commands 428 from serving base station(s) (e.g., Node Bs) 424 and DLTPC commands 416 from non-serving base stations 418 based on SIR estimate 420 of each non-serving base station 418 and a SIR estimate 421 of a serving base station 424.

In an aspect, call processing component 150, residing in UE 112, includes a transceiver module 426 in addition to power control module 414. Transceiver module 426 may include RF circuitry for sending/receiving RF signals to/from base stations (e.g., Nodes B), such as 418 and 424. Particularly, transceiver module 426 is operable to receive DLTPC commands, such as TPC command 428 from serving base station 424 and TPC command 416 from non-serving base station 418, on respective DL channels 430 and 432, which are F-DPCHs. The transceiver module 426 includes a demodulator/decoder 422, which demodulate and decode the DLTPC commands 416 and 428. As noted above, each DLTPC command usually includes a bit (e.g., where a "0" represents a "down" or reduce power command, and a "1" represents and "up" or increase transmit power command) to indicate an adjustment in transmit power of UE 112. Transceiver module 426 forwards the decoded DLTPC commands 416 and 428 to the power control module 414, which is configured to control transmitting power of UE 112 based on the received DLTPC commands 416 and 428.

In a case where UE 112 is in soft handoff with the serving base station 424, which provides a power controlled F-DPCH channel 428 (e.g., which consists of only DLTPC symbols), and one or more non-serving base stations 418, the demodulation and decoding of TPC commands 416 from non-serving base station 418 is vulnerable to decoding errors during bad channel conditions since TPC commands 416 are not power controlled. As a result, without the present apparatus and methods, when UE 112 performs the OR of the DOWNs combining of the DLTPC bits (e.g., where UE 112 will adjust power down if any base station transmits a power down command) across all (both power-controlled and non-power-controlled) base stations, the final decision of combining of the DLTPC bits across all base stations may be affected by the accuracy of the DLTPC decoding results of the non-serving base stations. It should be noted that combining of the DLTPC bits may also be performed by mechanisms other than OR of the DOWNs combining.

It should be noted that OR of the DOWNs combining of the DLTPC bits indicates that while UE 112 is in a soft handover with multiple NodeBs (i.e., different TPC IDs of radio frames coming from different NodeBs), UE 112 would keep monitoring the TPC commands in every slot continuously. Therefore, if a single NodeB asks UE 112 to go down (i.e., reduce power) by sending a TPC DOWN symbol, UE 112 will reduce the transmission power, irrespective of what other NodeBs are asking requesting. For example, if the commands are {1, 1, 0, 1} across different ASet members, UE 112 will go down because of the DOWN command from $3^{rd}$ NodeB.

According to the present apparatus and methods, however, power control module 414 includes a scale adjuster module 434 configured to adjust a non-serving BS DLTPC rejection threshold 436 for rejecting DLTPC commands 416, relative to a serving BS DLTPC rejection threshold 438, based on SIR estimate 420 for each non-serving base station 418, or based on a combination of SIR estimate 420 of each non-serving base station 418 and SIR estimate 421 of serving base station 424. For example, in an aspect, SIR estimate 420 of each non-serving base station 418 and SIR estimate 421 of serving base station 424 may be received from a SIR estimator module 440 of transceiver module 426.

In one aspect, scale adjuster module 434 increases non-serving BS DLTPC rejection threshold 436 based on non-serving base station SIR estimate 420 for non-serving base station 418. For example, in a non-limiting case, the smaller the SIR estimation, the higher the rejection threshold. Likewise, the higher the SIR estimation, the lower the rejection threshold.

In another aspect, for example, scale adjuster module 434 increases non-serving BS DLTPC rejection threshold 436 based on a difference between non-serving base station SIR estimate 420 and serving base station SIR estimate 421. For instance, in a non-limiting case, a positive difference value may be interpreted to indicate that the SIR is better with non-serving base station 418. As such, having such a positive difference value leads scale adjuster module 434 to set non-serving BS DLTPC rejection threshold 436 to be a lower or equal rejection threshold relative to serving BS DLTPC rejection threshold 438.

On the other hand, a negative difference value may be interpreted as indicating the SIR is worse with non-serving base station 418. As such, having such a negative difference value leads scale adjuster module 434 to set non-serving BS DLTPC rejection threshold 436 to be a higher rejection threshold relative to serving BS rejection DLTPC threshold 438. Indeed, the smaller the negative value, the more non-serving BS DLTPC rejection threshold 436 will be increased.

In other words, if the non-serving base station SIR is similar to the serving base station SIR, then the decoding performance of the non-serving base station is most likely similar to the serving base station as well. Thus, when the non-serving base station SIR is higher or lower than the serving base station SIR, scaling adjuster module 434 operates to adjust the non-serving base station rejection threshold accordingly.

Additionally, UE 112 includes a TPC evaluator module 442 configured to compare the received DLTPC's 416 and 428 to the respective non-serving BS DLTPC rejection threshold 436 and the serving BS DLTPC rejection threshold 438, and based on the result of the comparison, either reject or consider respective DLTPC 416 or 428 when making a combined transmit power adjustment 444. Generally, the combining of DLTPC 416 and 428 may, for example, follow the rule of OR of the DOWNs combining. Thereafter, power control module 414 may send transmit power adjustment 444 to transceiver module 426, where a transmit power control module 446 may correspondingly adjust a level of transmit power 448.

Indeed, TPC evaluator module 442 of UE 112 may be configured to combine DLTPC command 416 and DLTPC command 428 from a serving base station and one or more non-serving base stations. Thereafter, transmit power control module 446 of UE 412 adjust a level of transmit power 448 according to the combined DLTPC command of DLTPC 416 and DLTPC 428.

Thus, the present apparatus and methods enable UE 112 to improve the decision quality of transmit power adjustments in soft handoff scenarios by rejecting unreliable downlink transmit power control commands based on signal-to-interference-ratio estimates.

Figure 5:
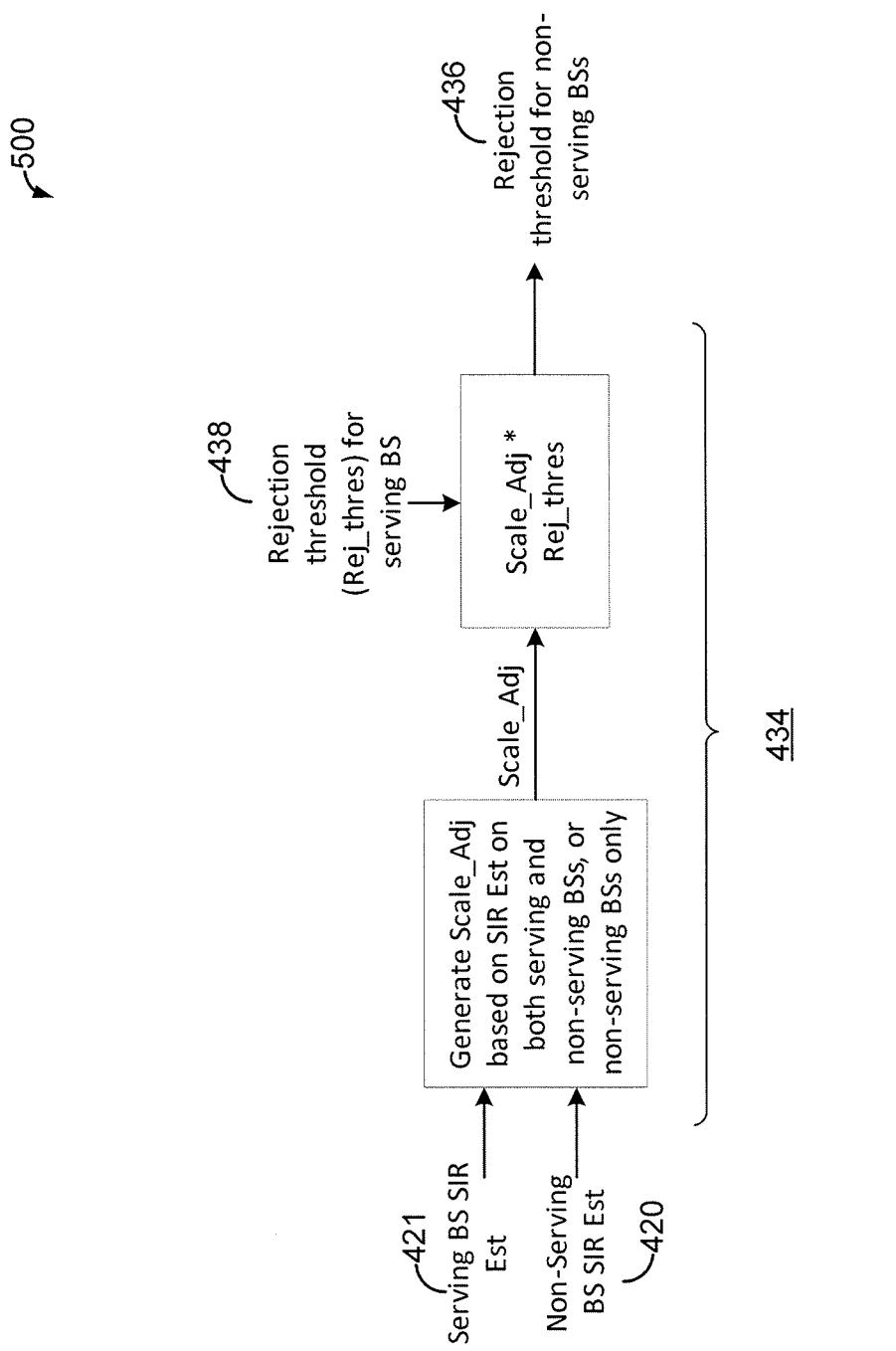
FIG. 5 is a block diagram an aspect of processing operations for rejecting unreliable DLTPC commands.

Referring to FIG. 5, in one implementation 500, as discussed above with reference to FIG. 4, a portion of the processing aspects of power control module 414 and scale adjuster module 434 (FIG. 4) are configured to dynamically adjust or scale a non-serving base station DLTPC rejection threshold by a scaling adjustment (scale_adj). The scaling adjustment is determined as a factor of only non-serving BS SIR estimate 420, or as a factor of both non-serving BS SIR estimate 420 and serving BS SIR estimate 421. Moreover, the non-serving BS DLTPC rejection threshold 436 is a factor of serving base station rejection threshold 438 and the determined scaling adjustment. For example, the lower the non-serving base station SIR estimate 420 is, or the lower the difference between the non-serving base station SIR estimate 420 and serving base station SIR estimate 421 is, the higher is the scale_adj parameter.

In one aspect, the scaling adjustment may be selected through a look up table (LUT) maintained by the power control module 414 and/or scale adjuster module 434. It should be noted that corresponding values between SIR estimates, or SIR estimate differences, and scale_adj parameters can be ready selected based on the specific implementation of the wireless communication system and environment in which UE operates. As such, based on the value of the DL SIR or DL SIR difference, the scale_adj is found for each and individual non-serving base station accordingly. However, other methods can also be adopted to adjust the rejection thresholds based on the DL SIR.

Additionally, it should be noted that, in some aspects, non-serving BS DLTPC rejection threshold 436 may include a down DLTPC rejection threshold and up DLTPC rejection threshold, each of which are scaled appropriately.

Once non-serving BS DLTPC rejection threshold 436 has been calculated and scaled (adjusted) by the appropriate scaling adjustment, TPC evaluator module 442 will compare signal energies of the respective DLTPC command 416 with non-serving BS DLTPC rejection threshold 436. In one aspect, TPC evaluator module 442 will reject a negative or "decrease power" DLTPC command if the signal energy of the DLTPC command is below non-serving BS DLTPC rejection threshold 436. In another aspect, TPC evaluator module 442 will accept a negative or "decrease power" DLTPC command if the signal energy of the DLTPC command is equal to or above non-serving BS DLTPC rejection threshold 436.

Correspondingly, the power control module 414 will instruct transceiver module 426 to make appropriate power adjustments to the transmit signal of UE 112.

Figure 6:
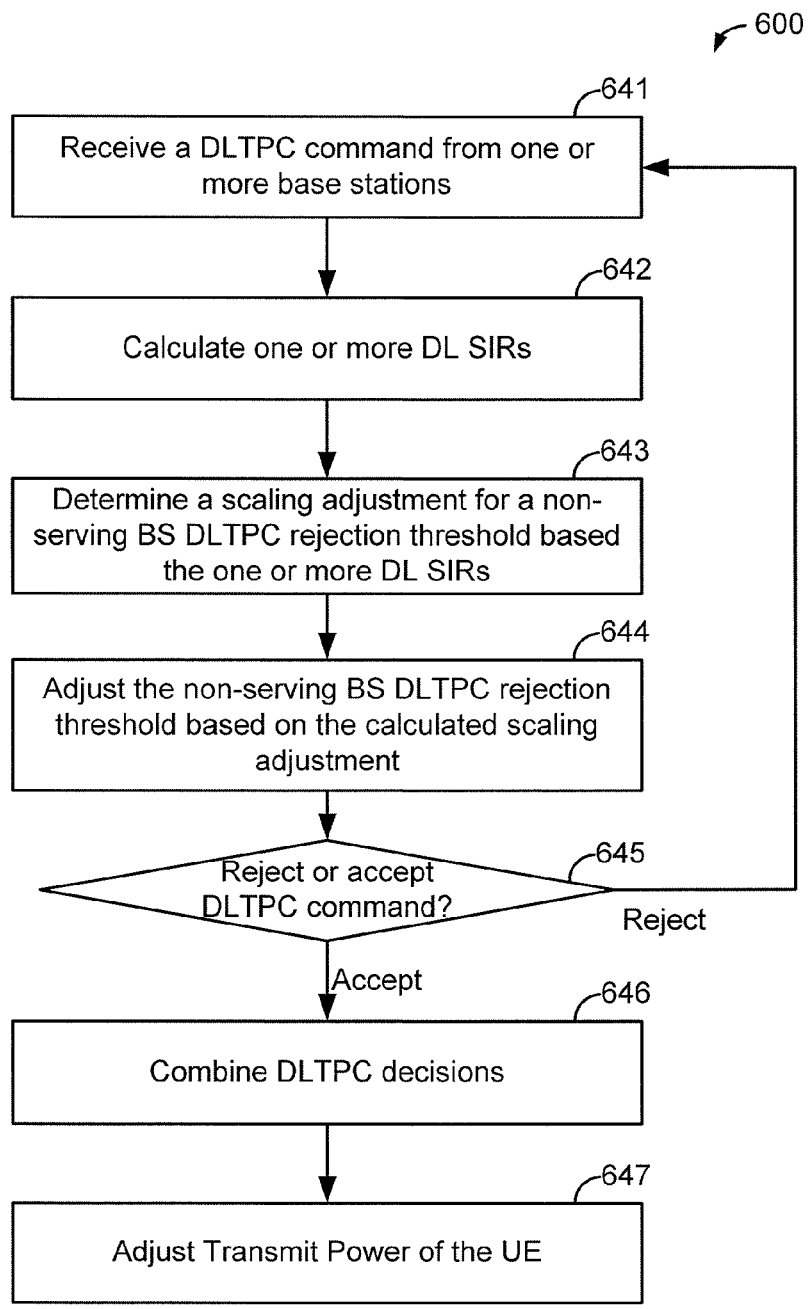
FIG. 6 is a flow chart of an aspect of a methodology for rejecting unreliable DLTPC commands.

Referring to FIG. 6, in an aspect, an example methodology 600 for rejecting unreliable DLTPC commands includes, at 641, the UE receiving a DLTPC command on an F-DPCH from one or more base stations. For example, as discussed above with reference to FIG. 4, transceiver module 426 of UE 112 may be configured to receive DLTPC command 416 from non-serving base station 418, or transceiver module 426 may be configured to receive DLTPC commands 416 and 428 respectively from non-serving and serving base stations 418 and 424.

At step 642, UE 112 calculates a DL SIR estimate for one or more base stations. For example, after transceiver module 426 of UE 112 DLTPC commands 416 and 428 respectively from non-serving and serving base stations 418 and 424, SIR estimator 440 of UE 112 is configured to calculate non-serving base station SIR estimate 420 for non-serving base station 418 and configured to calculate serving base station SIR estimate 421 for serving base station 424.

At step 643, UE 112 determines a scaling adjustment for a non-serving base station DLTPC rejection threshold based on one or both DL SIRs. For example, after SIR estimator 440 of UE 112 calculates SIR estimate 420 for non-serving base station 418 and calculates SIR estimate 421 for serving base station 424, scale adjuster module 434 of UE 112 is configured to determine the scaling adjustment for non-serving BS DLTPC rejection threshold 436 for rejecting DLTPC commands 416 based on SIR estimate 420 for each non-serving base station 418, or based on a combination of SIR estimate 420 of each non-serving base station 418 and SIR estimate 421 of serving base station 424.

At step 644, UE 112 adjusts the non-serving base station DLTPC rejection threshold based on the determined scaling adjustment. For example, after scale adjuster module 434 of UE 112 determines the scaling adjustment for non-serving BS DLTPC rejection threshold 436, scale adjuster module 434 of UE 112 is configured to increase or decrease non-serving BS DLTPC rejection threshold 436 based on the scaling adjustment for non-serving BS DLTPC rejection threshold 436.

At steps 645, UE 112 determines whether to reject or accept the non-serving base station DLTPC command based on the adjusted non-serving base station DLTPC rejection threshold (as well as determining whether to reject or accept the serving base station DLTPC command based on the serving base station DLTPC rejection threshold). For example, after scale adjuster module 434 of UE 112 increases or decreases non-serving BS DLTPC rejection threshold 436 based on the scaling adjustment for non-serving BS DLTPC rejection threshold 436, TPC evaluator module 442 of UE 112 is configure to reject or accept received DLTPC 416 or DLTPC 428 based on a comparison of the received DLTPC 416 and DLTPC 428 to the respective non-serving BS DLTPC rejection threshold 436 and the serving BS DLTPC rejection threshold 438.

At step 646, UE 112 may combine the DLTPC decisions from the serving and one or more non-serving base stations. For example, based on the comparison of the received DLTPC 416 and DLTPC 428 to the respective non-serving BS DLTPC rejection threshold 436 and the serving BS DLTPC rejection threshold 438, TPC evaluator module 442 of UE 112 combines DLTPC 416 and DLTPC 428 according to the rule of OR of the DOWNs combining.

At step 647, UE 112 may adjust the transmit power according to the combined DLTPC command if not all the DLTPC commands 416 and 428 are rejected. For example, after TPC evaluator module 442 of UE 112 combines DLTPC 416 and DLTPC 428 according to the rule of OR of the DOWNs combining, transmit power control module 446 of UE 112 adjust a level of transmit power 448 according to the combined DLTPC command of DLTPC 416 and DLTPC 428.

Figure 7:
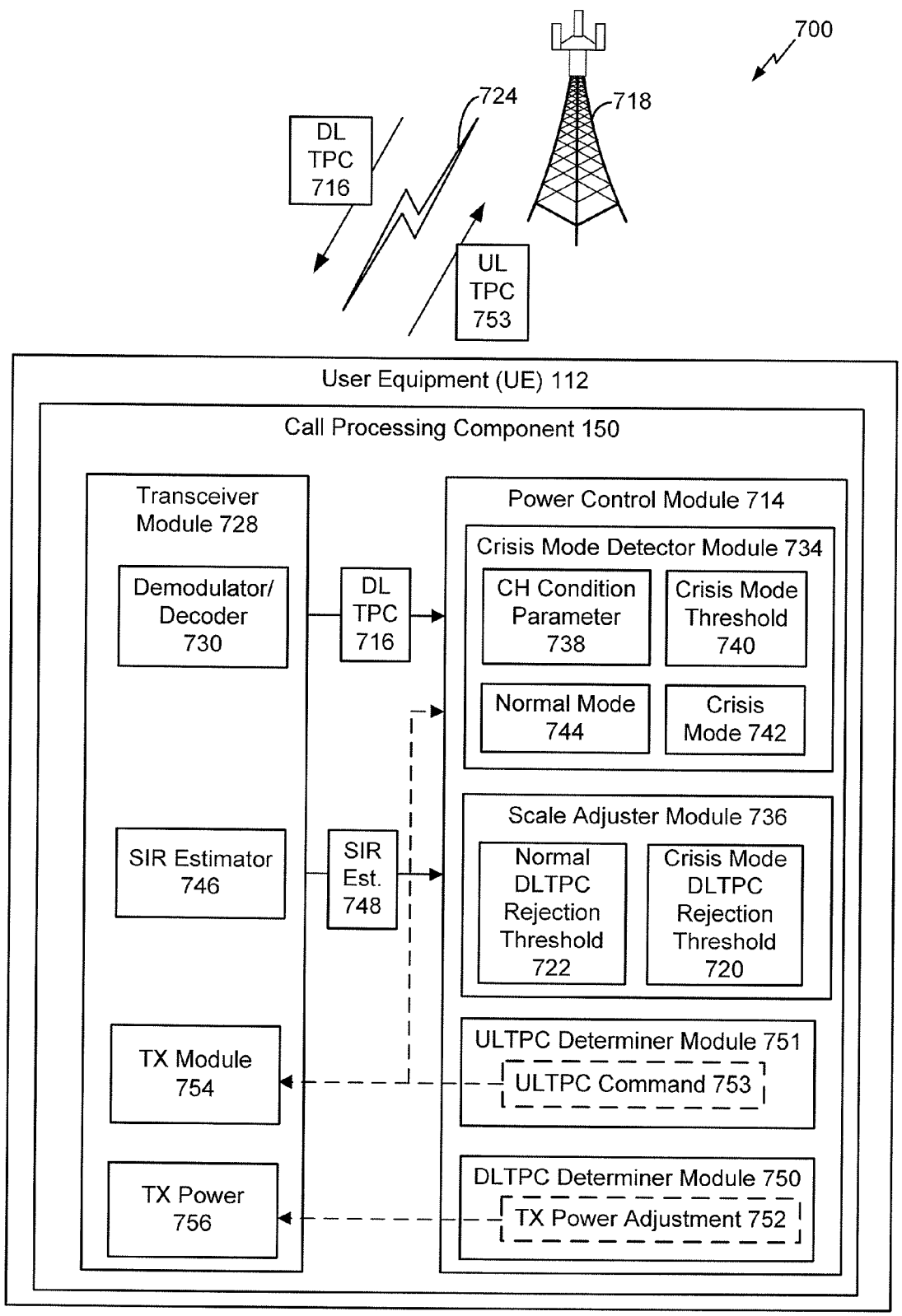
FIG. 7 is a block diagram second aspect of a system including a UE configured for rejecting unreliable DLTPC commands.

Referring to FIG. 7, in an aspect, a wireless communication system 700 (referred to as wireless communication system 100 in FIG. 1) includes a UE 112 having a power control module 714 configured to reject unreliable DLTPC commands 716 (similar to DLTPC 428 of FIG. 4) sent during extreme channel conditions from a serving base station (e.g., Node B) 718 (similar to base station 424 of FIG. 4) based on an adjusted DLTPC rejection threshold. Adjusted DLTPC rejection threshold may be also referred to herein as a crisis mode DLTPC rejection threshold 720. For example, crisis mode DLTPC rejection threshold 720 may have a value greater than a normal DLTPC rejection threshold 722 used during operation of UE 112 when conditions of channel 724 with serving base station 718 is within standard or otherwise typically acceptable conditions for maintaining channel 724. As such, UE 112 executing power control module 714 avoids making DL power control decisions, e.g. a transmit power adjustment 752, based on unreliably received and/or decoded DLTPC commands 716 during extreme channel conditions, which without the present apparatus and methods may negatively impact subsequent downlink transmissions from serving base station 718 and hence reliability of UE 112 in decoding channel 724.

In an aspect, UE 112 includes a transceiver module 728 in addition to power control module 714. As discussed above, transceiver module 728 may include RF circuitry for sending/receiving RF signals to/from base stations (e.g., Nodes B), such as serving base station 718. In an aspect, the RF signals may be received in channel 724, which may include one or more downlink channels such as, but not limited to, F-DPCH. Further, the RF signals may include, but are not limited to, DLTPC command 716 from serving base station 718. In an aspect, transceiver module 728 includes a demodulator/decoder 730, which demodulates and decodes the received DLTPC command 716. For example, as discussed above, each DLTPC command usually includes a bit (e.g., where a "0" represents a "down" or "negative" or reduce power command, and a "1" represents an "up" or "positive" or increase transmit power command) to indicate an adjustment in transmit power of UE 112. Transceiver module 728 forwards the decoded DLTPC command 716 to power control module 714, which is configured to control transmitting power of UE 112 based on the received DLTPC command 716.

In a case where channel 724 between UE 112 and serving base station 718 is experiencing extreme channel conditions, e.g. severe path loss and/or fading, however, the demodulation and decoding of DLTPC commands 716 from serving base station 718 is vulnerable to decoding errors. For example, as used herein, the term "extreme channel conditions" may include, but is not limited to, a channel condition where the serving base station cannot transmit with enough power for a received signal at UE 112 to meet a SIR target. For instance, a SIR target may correspond to a specific SIR level at which UE 112 may reliably decode a received signal. As a result, without the present apparatus and methods, when UE 112 decodes the received DLTPC command 716 and compares its energy value to normal DLTPC rejection threshold 722 that may be optimized for normal channel conditions, the DLTPC bits might not be rejected enough which leads to large amount of decoding errors.

According to the present apparatus and methods, however, power control module 714 includes a crisis mode detector module 734 configured to detect extreme channel conditions, and a scale adjuster module 736 configured to determine crisis mode DLTPC rejection threshold 720 for rejecting DLTPC commands 716 during the extreme channel conditions. For example, in an aspect, crisis mode detector module 734 is configured to compare at least one channel condition parameter 738 to a crisis mode threshold 740, and determine a crisis mode operational state 742 when channel condition parameter 738 meets crisis mode threshold 740.

In an aspect, crisis mode operational state 742 triggers power control module 714, and in particular DLTPC determiner module 750, to utilize crisis mode DLTPC rejection threshold 720 instead of normal DLTPC rejection threshold 722 to evaluate received DLTPC command 716 in order to make internal DLTPC command 752 to adjust transmit power 756. Alternatively, when crisis mode detector module 736 determines that channel condition parameter 738 does not meet crisis mode threshold 740, then a normal mode operational state 744 is determined, and normal DLTPC rejection threshold 722 can be used to evaluate received DLTPC command 716.

Channel condition parameter 738 may include, but is not limited to, one or more of a parameter (e.g., a percentage or number over a given time period) related to a number of positive or increase power indications in a plurality of uplink (UL) transmit power control (TPC) commands transmitted by the UE, and a parameter (e.g., a value or delta relative to a target) related to a DL signal-interference ratio (SIR) corresponding to a signal received at the UE, e.g. including a signal such as the F-DPCH from the serving base station. For example, UE 112 and/or transceiver module 728 may include a SIR estimator 746 configured to generate SIR estimate 748 based on a received signal, such as DLTPC 716. Further, for example, UE 112 and/or power control module 714 may include an ULTPC determiner 751 configured to evaluate received signals, such as based on SIR estimate 748, and generate ULTPC command 753 to request a change in downlink transmission power for transmission to serving base station 718, such as by a transmission module 754 of transceiver module 728.

Further, in an aspect, scale adjuster module 736 is configured to determine a scale adjustment, e.g. an increase in value, to apply to normal DLTPC rejection threshold 722 to generate crisis mode DLTPC rejection threshold 720. For example, scale adjuster module 734 may operate to increase crisis mode DLTPC rejection threshold 720 relative to normal DLTPC rejection threshold 722 based on at least one channel condition parameter 738. For example, but not limited to hereto, channel condition parameter 738 used by scale adjuster module 736 may include one or more of a DL SIR corresponding to a signal received at the UE, e.g. including F-DPCH from the serving base station (e.g., the smaller the SIR, the higher the rejection threshold), a difference between the DL SIR and a SIR target (e.g., the larger the difference, the higher the rejection threshold), and a factor (e.g., a percentage, a total number, etc.) related to a number of positive or increase power indications in a plurality of ULTPC commands transmitted by the UE (e.g., the more positive or increase power indications, the higher the rejection threshold).

Accordingly, based on operation of crisis mode detector module 734 and scale adjuster module 736, DLTPC determiner module 750 evaluates received DLTPC command 716 based on either normal DLTPC rejection threshold 722, e.g. in normal channel conditions, or crisis mode DLTPC rejection threshold 720, e.g. in extreme channel conditions, to determine whether or not to generate transmit power adjustment 752, and of what value (e.g. positive or negative), to thereby change a level of transmit power 756. In other words, DLTPC determiner module 750 is configured to compare the received DLTPC 716 to the respective DLTPC rejection threshold, and based on the result either reject or consider the DLTPC 716 in making transmit power adjustment 752. Power control module 714 may then send transmit power adjustment 752 to transceiver module 728, where transmit module 750 may correspondingly adjust a level of transmit power 756.

Thus, the present apparatus and methods enable UE 112 to improve the decision quality of transmit power adjustments in extreme channel scenarios by increasing the DLTPC rejection threshold, thereby avoiding consideration of unreliable DLTPC commands in making transmit power level adjustments.

Figure 8:
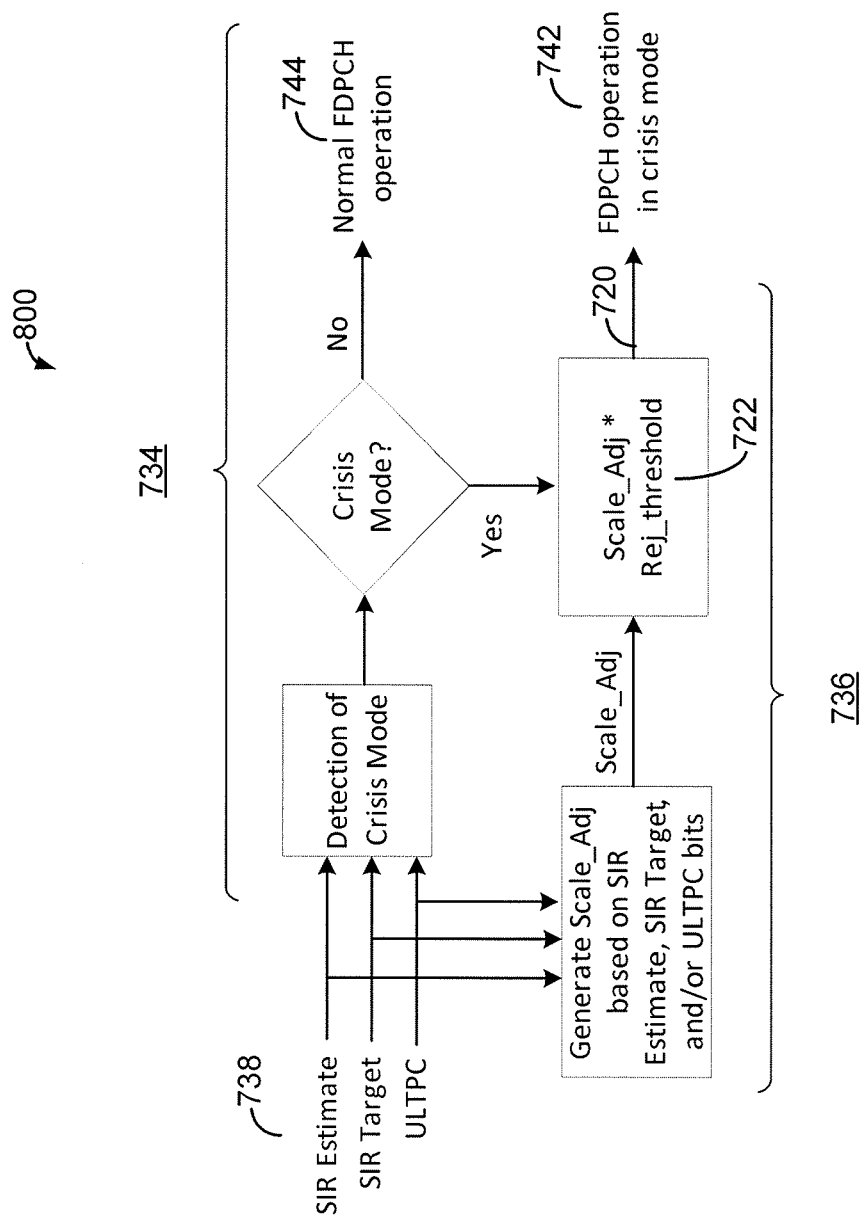
FIG. 8 is a block diagram second aspect of processing operations for rejecting unreliable DLTPC commands.

Referring to FIG. 8, in one implementation 800, as discussed above with reference to FIG. 7, power control module 714, crisis mode detector module 734, and scale adjuster module 736 are configured to detect a crisis mode corresponding to extreme channel conditions, and dynamically adjust or scale a normal DLTPC rejection threshold to use for evaluating received DLTPC commands during the crisis mode. For instance, crises mode detector module 734 receives one or more channel conditions 738 and evaluates them, e.g., via comparison with a threshold, to determine whether to operate in normal mode operational state 744 or crisis mode operational state 742. As noted above, in normal mode operation state 744, DLTPC determiner module 750 uses normal DLTPC rejection threshold 722 to evaluate received DLTPC command 716 and determine transmit power adjustment 728.

In contrast, when crisis mode detector module 734 determines crisis mode operational state 742, then scale adjuster module 736 operates on one or more channel condition parameters 738 to generate a scaling adjustment (scale_adj). For example, but not limited hereto, the scaling adjustment may be selected through a look up table (LUT) maintained by the power control module 714 and/or scale adjuster module 736. It should be noted that corresponding values between channel condition parameters 738 and scale_adj can be ready selected based on the specific implementation of the wireless communication system and environment in which UE 112 operates. For instance, based on the value of one or more of a SIR estimate, a SIR target, and/or ULTPC, the scale_adj is found accordingly. However, other methods can also be adopted to adjust the rejection thresholds based on one or more DL channel condition parameter 738. In any case, in this aspect, scale adjuster module 736 modifies normal DLTPC rejection threshold 722 by the calculated scale_adj, such as but not limited to, by multiplication, to generate crisis mode DLTPC rejection threshold 720.

Once crisis mode DLTPC rejection threshold 720 has been calculated, during crisis mode operational state 742, DLTPC determiner module 750 will compare signal energies of the received DLTPC command 716 with crisis mode DLTPC rejection threshold 720. For example, in one aspect, DLTPC determiner module 750 will reject a negative or "decrease power" DLTPC command 716 if the signal energy of the DLTPC command 716 does not exceed the crisis mode DLTPC rejection threshold 720.

Correspondingly, the power control module 714 will instruct transceiver module 752 to make appropriate power adjustments to the transmit signal of UE 112.

Figure 9:
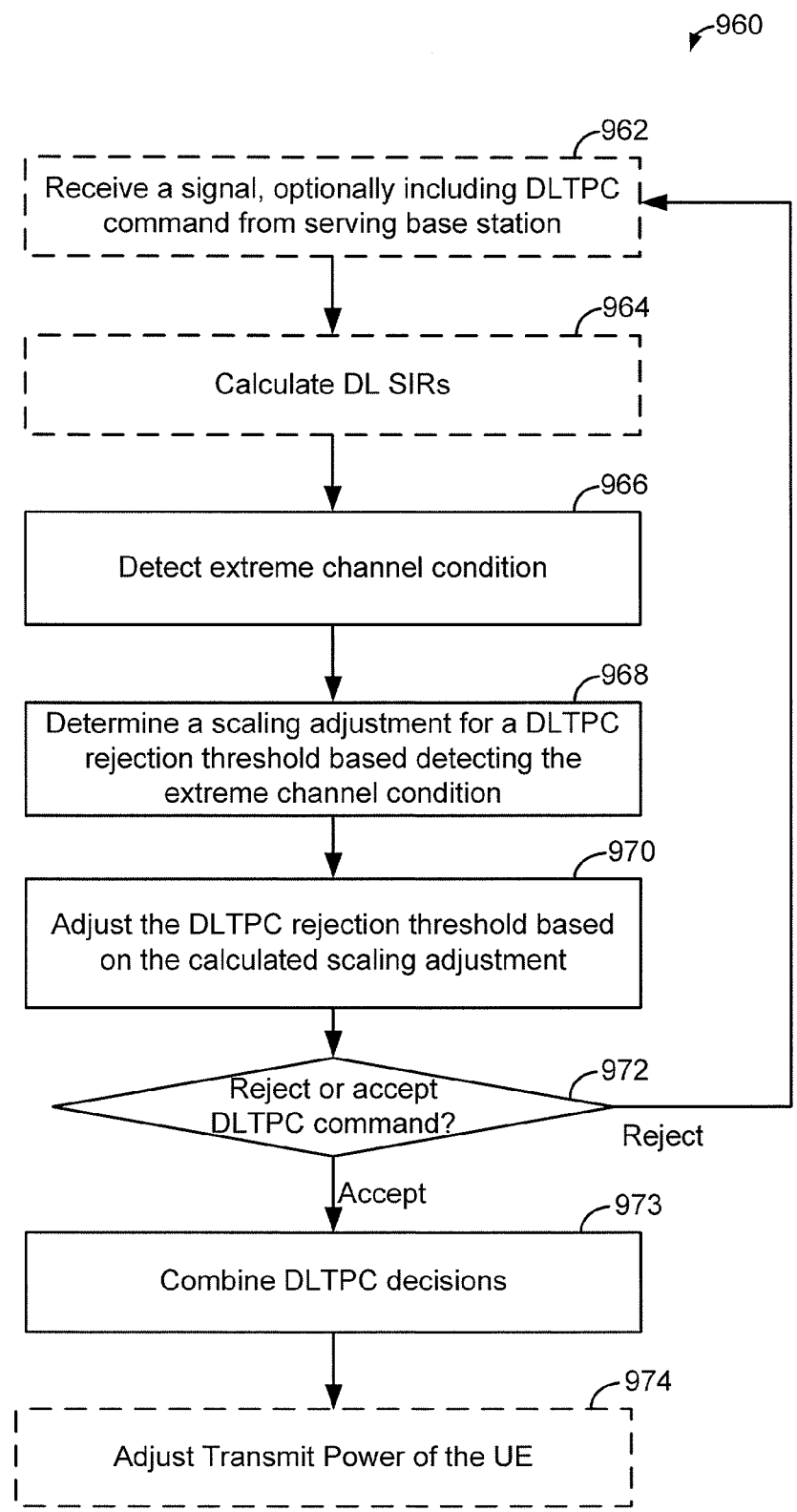
FIG. 9 is a flow chart of second aspect of a methodology for rejecting unreliable DLTPC commands.

Referring to FIG. 9, in an aspect, an example methodology 960 for rejecting unreliable DLTPC commands includes, at 962, the UE receives a DLTPC command from one or more base stations. For example, as discussed above with reference to FIG. 7, UE 112 may receive DLTPC command 716 from serving base station 718.

Optionally, at step 964, UE 112 calculates a DL SIR based on the received DLTPC. For example, UE 112 may calculate DL SIR 748 based on received DLTPC command 716.

At 966, UE 112 detects an extreme channel condition for a channel from a serving base station. For example, after receiving DLTPC command 716 from serving base station 718, UE 112 may detect an extreme channel condition for the F-DPCH from serving base station 718.

At step 968, UE 112 determines a scaling adjustment for a DLTPC rejection threshold based on detecting the extreme channel condition. For example, after detecting an extreme channel condition for the F-DPCH from serving base station 718, UE 112 determines a scaling adjustment according to scale adjuster module 736 for a DLTPC rejection threshold based on detecting the extreme channel condition.

At step 970, UE 112 adjusts the DLTPC rejection threshold based on the determined scaling adjustment. For example, after determining a scaling adjustment according to scale adjuster module 736 for a DLTPC rejection threshold based on detecting the extreme channel condition, UE 112 adjusts the DLTPC rejection threshold based on the determined scaling adjustment determined by scale adjuster module 736.

At step 972, the UE 112 determines whether to reject or accept the serving base station DLTPC command based on the adjusted DLTPC rejection threshold. For example, after adjusting the DLTPC rejection threshold based on the determined scaling adjustment determined by scale adjuster module 736, UE 112 determines whether to reject or accept serving base station 718 DLTPC command 716 based on the adjusted DLTPC rejection threshold.

At step 973, UE 112 may combine the DLTPC decisions from the serving and one or more non-serving base stations. At step 974, the UE 112 may adjust the transmit power according to the combined DLTPC command if not all the DLTPC commands 416 and 428 are rejected.

Figure 10:
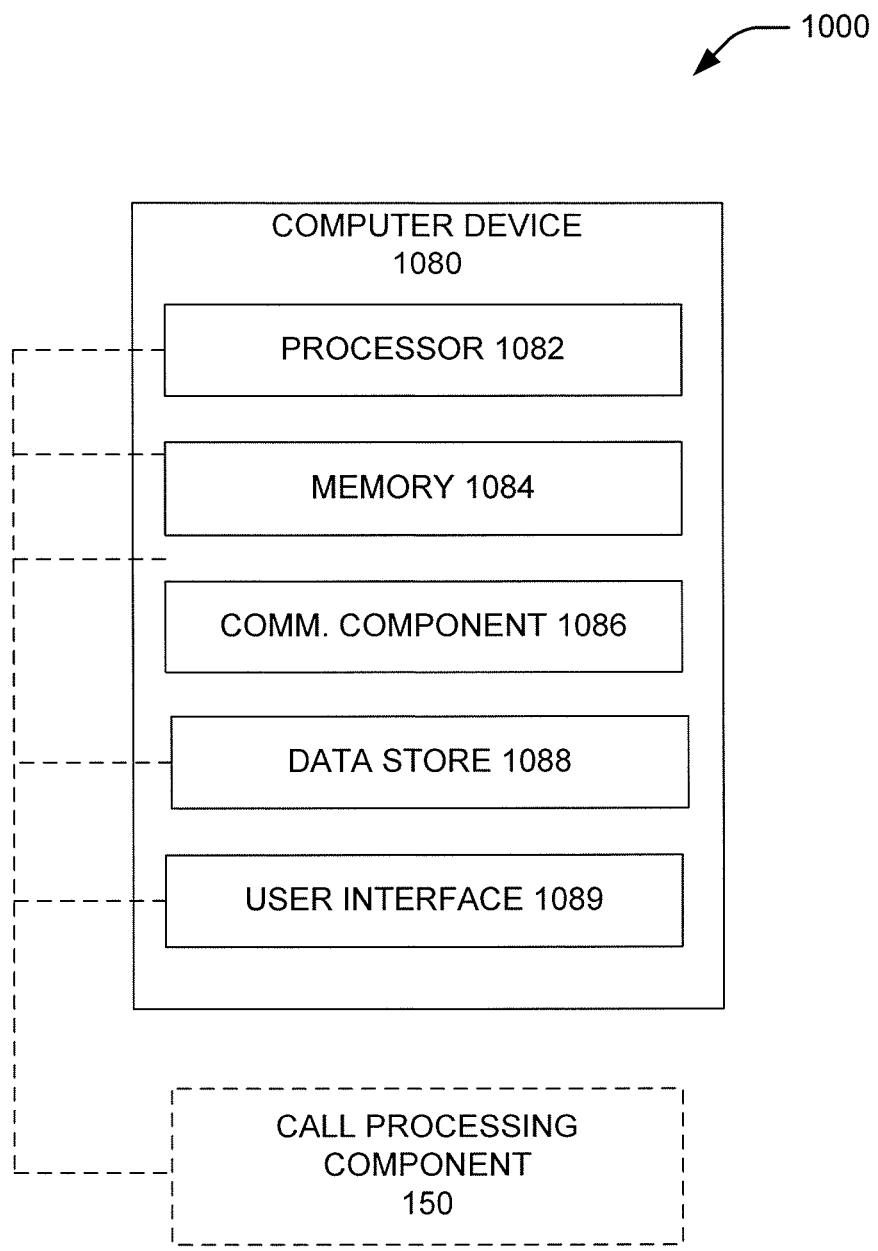
FIG. 10 is a block diagram illustrating additional example components of an aspect of a computer device having a call processing component according to the present disclosure.

Referring to the computer system 1000 of FIG. 10, in one aspect, UE 112 and/or wireless serving node 116 of FIG. 1 may be represented by a specially programmed or configured computer device 1080, wherein the special programming or configuration includes call processing component 150, as described herein. For example, for implementation as UE 112 (FIG. 1, 2, 4 or 7), computer device 1080 may include one or more components for computing and transmitting a data from a UE 112 to network 110 via wireless serving node 111, such as in specially programmed computer readable instructions or code, firmware, hardware, or some combination thereof. Computer device 1080 includes a processor 1082 for carrying out processing functions associated with one or more of components and functions described herein. Processor 1082 can include a single or multiple set of processors or multi-core processors. Moreover, processor 1082 can be implemented as an integrated processing system and/or a distributed processing system.

Computer device 1080 further includes a memory 1084, such as for storing data used herein and/or local versions of applications being executed by processor 1082. Memory 1084 can include any type of memory usable by a computer, such as random access memory (RAM), read only memory (ROM), tapes, magnetic discs, optical discs, volatile memory, non-volatile memory, and any combination thereof.

Further, computer device 1080 includes a communications component 1086 that provides for establishing and maintaining communications with one or more parties utilizing hardware, software, and services as described herein. Communications component 1086 may carry communications between components on computer device 1080, as well as between computer device 1080 and external devices, such as devices located across a communications network and/or devices serially or locally connected to computer device 1080. For example, communications component 1086 may include one or more buses, and may further include transmit chain components and receive chain components associated with a transmitter and receiver, respectively, or a transceiver, operable for interfacing with external devices. For example, in an aspect, a receiver of communications component 1086 operates to receive one or more data via a wireless serving node 116, which may be a part of memory 1084.

Additionally, computer device 1080 may further include a data store 1088, which can be any suitable combination of hardware and/or software, that provides for mass storage of information, databases, and programs employed in connection with aspects described herein. For example, data store 1088 may be a data repository for applications not currently being executed by processor 1082.

Computer device 1080 may additionally include a user interface component 1089 operable to receive inputs from a user of computer device 1080, and further operable to generate outputs for presentation to the user. User interface component 1089 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 1089 may include one or more output devices, including but not limited to a display, a speaker, a haptic feedback mechanism, a printer, any other mechanism capable of presenting an output to a user, or any combination thereof.

Furthermore, computer device 1080 may include, or may be in communication with, call processing component 150, which may be configured to perform the functions described herein.

Figure 11:
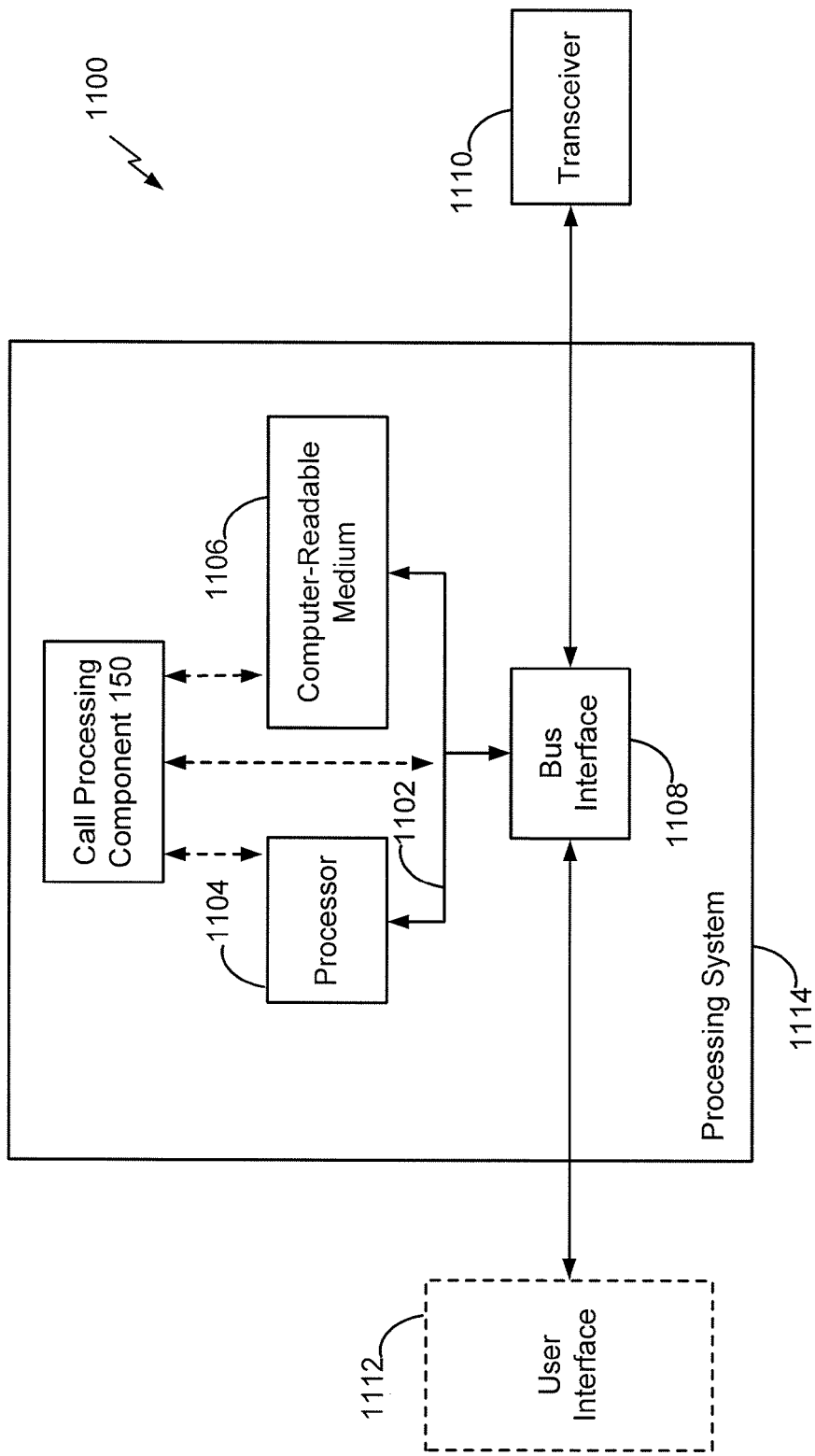
FIG. 11 is a block diagram illustrating an example of a hardware implementation for an apparatus employing a processing system to perform the functions described herein.

FIG. 11 is a block diagram illustrating an example of a hardware implementation for an apparatus 1100 employing a processing system 1114. Apparatus 1100 may be configured to include, for example, the call processing component 150 (FIG. 1, 2, 4 or 7) implementing the components described above, such as transceiver module (226, 426, 728), demodulator (222, 422, 730), TX power control module (264, 446, 754), transmit power (248, 448, 758), power control module (214, 414, 714), and scale adjuster module (234, 434, 734). The bus 1102 may include any number of interconnecting buses and bridges depending on the specific application of the processing system 1114 and the overall design constraints. The bus 1102 links together various circuits including one or more processors, represented generally by the processor 1104, and computer-readable media, represented generally by the computer-readable medium 1106. The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a means for communicating with various other apparatus over a transmission medium. Depending upon the nature of the apparatus, a user interface 1112 (e.g., keypad, display, speaker, microphone, joystick) may also be provided.

The processor 1104 is responsible for managing the bus 1102 and general processing, including the execution of software stored on the computer-readable medium 1106. The software, when executed by the processor 1104, causes the processing system 1114 to perform the various functions described infra for any particular apparatus. The computer-readable medium 1106 may also be used for storing data that is manipulated by the processor 1104 when executing software.

In an aspect, processor 1104, computer-readable medium 1106, or a combination of both may be configured or otherwise specially programmed to perform the functionality of the call processing component 150 (FIG. 1, 2, 4 or 7) as described herein.

The various concepts presented throughout this disclosure may be implemented across a broad variety of telecommunication systems, network architectures, and communication standards.

Figure 12:
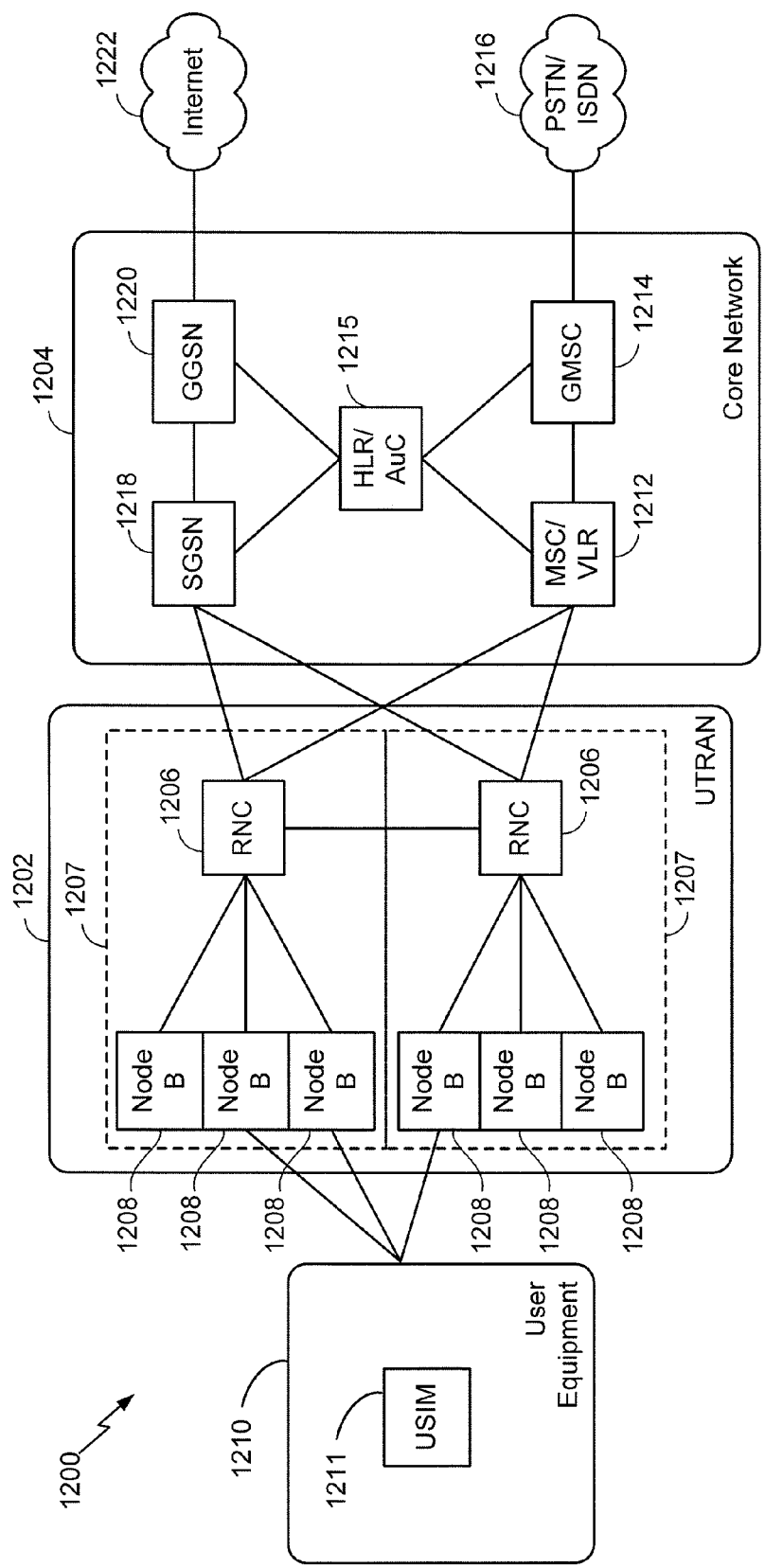
FIG. 12 is a block diagram conceptually illustrating an example of a telecommunications system including a UE configured to perform the functions described herein.

Referring to FIG. 12, by way of example and without limitation, the aspects of the present disclosure are presented with reference to a UMTS system 1200 employing a W-CDMA air interface. A UMTS network includes three interacting domains: a Core Network (CN) 1204, a UMTS Terrestrial Radio Access Network (UTRAN) 1202, and User Equipment (UE) 1210. UE 1210 may be configured to include, for example, the call processing component 150 (FIG. 1, 2, 4 or 7) implementing the components described above, such as transceiver module (226, 426, 728), demodulator (222, 422, 730), TX power control module (264, 446, 754), transmit power (248, 448, 758), power control module (214, 414, 714), and scale adjuster module (234, 434, 734). In this example, the UTRAN 1202 provides various wireless services including telephony, video, data, messaging, broadcasts, and/or other services. The UTRAN 1202 may include a plurality of Radio Network Subsystems (RNSs) such as an RNS 1207, each controlled by a respective Radio Network Controller (RNC) such as an RNC 1206. Here, the UTRAN 1202 may include any number of RNCs 1206 and RNSs 1207 in addition to the RNCs 1206 and RNSs 1207 illustrated herein. The RNC 1206 is an apparatus responsible for, among other things, assigning, reconfiguring and releasing radio resources within the RNS 1206. The RNC 1206 may be interconnected to other RNCs (not shown) in the UTRAN 1202 through various types of interfaces such as a direct physical connection, a virtual network, or the like, using any suitable transport network.

Communication between a UE 1210 and a Node B 1208 may be considered as including a physical (PHY) layer and a medium access control (MAC) layer. Further, communication between a UE 1210 and an RNC 1206 by way of a respective Node B 1208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 24.331, incorporated herein by reference.

The geographic region covered by the RNS 1207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 1208 are shown in each RNS 1207; however, the RNSs 1207 may include any number of wireless Node Bs. The Node Bs 1208 provide wireless access points to a CN 1204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 1210 is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 1210 may further include a universal subscriber identity module (USIM) 1211, which contains a user's subscription information to a network. For illustrative purposes, one UE 1210 is shown in communication with a number of the Node Bs 1208. The DL, also called the forward link, refers to the communication link from a Node B 1208 to a UE 1210, and the UL, also called the reverse link, refers to the communication link from a UE 1210 to a Node B 1208.

The CN 1204 interfaces with one or more access networks, such as the UTRAN 1202. As shown, the CN 1204 is a GSM core network. However, as those skilled in the art will recognize, the various concepts presented throughout this disclosure may be implemented in a RAN, or other suitable access network, to provide UEs with access to types of CNs other than GSM networks.

The CN 1204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 1204 supports circuit-switched services with a MSC 1212 and a GMSC 1214. In some applications, the GMSC 1214 may be referred to as a media gateway (MGW). One or more RNCs, such as the RNC 1206, may be connected to the MSC 1212. The MSC 1212 is an apparatus that controls call setup, call routing, and UE mobility functions. The MSC 1212 also includes a VLR that contains subscriber-related information for the duration that a UE is in the coverage area of the MSC 1212. The GMSC 1214 provides a gateway through the MSC 1212 for the UE to access a circuit-switched network 1216. The GMSC 1214 includes a home location register (HLR) 1214 containing subscriber data, such as the data reflecting the details of the services to which a particular user has subscribed. The HLR is also associated with an authentication center (AuC) that contains subscriber-specific authentication data. When a call is received for a particular UE, the GMSC 1214 queries the HLR 1214 to determine the UE's location and forwards the call to the particular MSC serving that location.

The CN 1204 also supports packet-data services with a serving GPRS support node (SGSN) 1218 and a gateway GPRS support node (GGSN) 1220. GPRS, which stands for General Packet Radio Service, is designed to provide packet-data services at speeds higher than those available with standard circuit-switched data services. The GGSN 1220 provides a connection for the UTRAN 1202 to a packet-based network 1222. The packet-based network 1222 may be the Internet, a private data network, or some other suitable packet-based network. The primary function of the GGSN 1220 is to provide the UEs 1210 with packet-based network connectivity. Data packets may be transferred between the GGSN 1220 and the UEs 1210 through the SGSN 1218, which performs primarily the same functions in the packet-based domain as the MSC 1212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 1208 and a UE 1210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARM), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 1210 provides feedback to the node B 1208 over the HS-DPCCH to indicate whether it correctly decoded a packet on the downlink.

HS-DPCCH further includes feedback signaling from the UE 1210 to assist the node B 1208 in taking the right decision in terms of modulation and coding scheme and precoding weight selection, this feedback signaling including the CQI and PCI.

"HSPA Evolved" or HSPA+ is an evolution of the HSPA standard that includes MIMO and 124-QAM, enabling increased throughput and higher performance. That is, in an aspect of the disclosure, the node B 1208 and/or the UE 1210 may have multiple antennas supporting MIMO technology. The use of MIMO technology enables the node B 1208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 1210 to increase the data rate, or to multiple UEs 1210 to increase the overall system capacity. This is achieved by spatially precoding each data stream and then transmitting each spatially precoded stream through a different transmit antenna on the downlink. The spatially precoded data streams arrive at the UE(s) 1210 with different spatial signatures, which enables each of the UE(s) 1210 to recover the one or more the data streams destined for that UE 1210. On the uplink, each UE 1210 may transmit one or more spatially precoded data streams, which enables the node B 1208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 13:
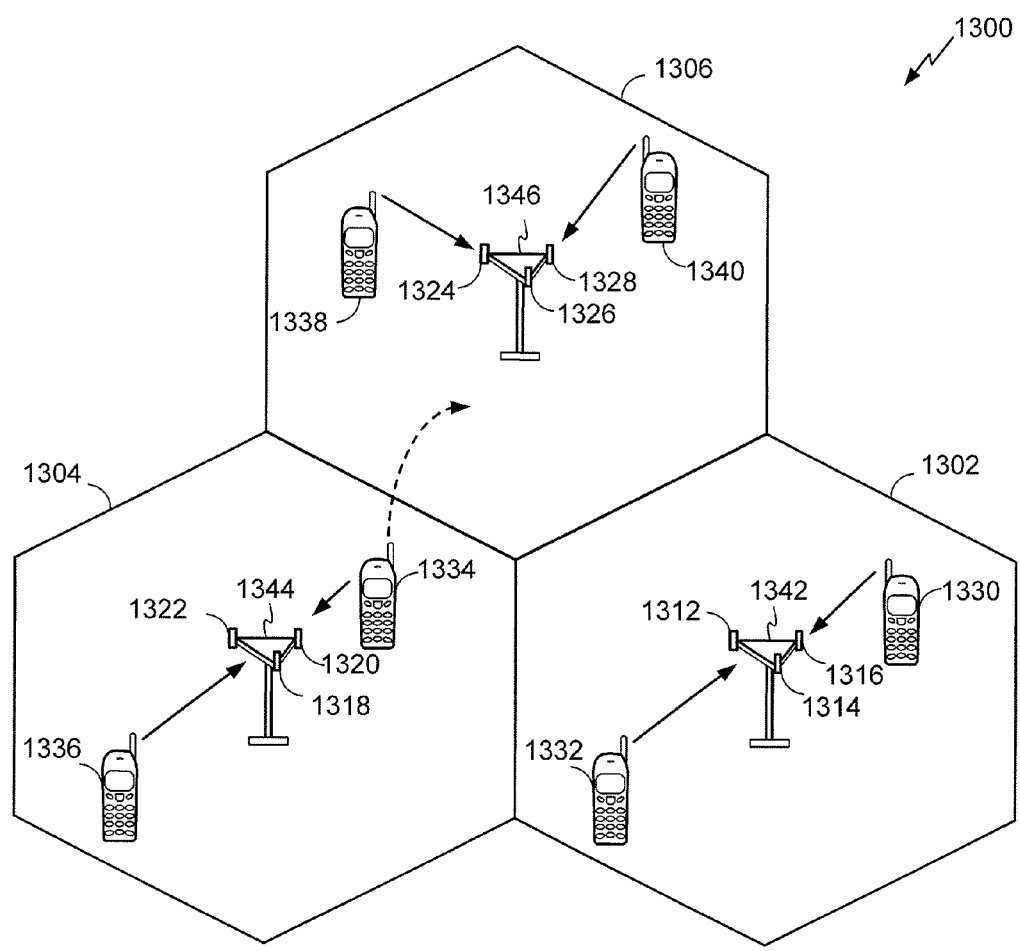
FIG. 13 is a conceptual diagram illustrating an example of an access network for use with a UE configured to perform the functions described herein.

Referring to FIG. 13, an access network 1300 in a UTRAN architecture is illustrated. The multiple access wireless communication system includes multiple cellular regions (cells), including cells 1302, 1304, and 1306, each of which may include one or more sectors. The multiple sectors can be formed by groups of antennas with each antenna responsible for communication with UEs in a portion of the cell. For example, in cell 1302, antenna groups 1312, 1314, and 1316 may each correspond to a different sector. In cell 1304, antenna groups 1318, 1320, and 1322 each correspond to a different sector. In cell 1306, antenna groups 1324, 1326, and 1328 each correspond to a different sector. The cells 1302, 1304 and 1306 may include several wireless communication devices, e.g., User Equipment or UEs, which may be in communication with one or more sectors of each cell 1302, 1304 or 1306. For example, UEs 1330 and 1332 may be in communication with Node B 1342, UEs 1334 and 1336 may be in communication with Node B 1344, and UEs 1338 and 1340 can be in communication with Node B 1346. Here, each Node B 1342, 1344, 1346 is configured to provide an access point to a CN 1204 (see FIG. 12) for all the UEs 1330, 1332, 1334, 1336, 1338, 1340 in the respective cells 1302, 1304, and 1306. Node Bs 1342, 1344, 1346 and UEs 1330, 1332, 1334, 1336, 1338, 1340 respectively may be configured to include, for example, the call processing component 150 (FIG. 1, 2, 4 or 7) implementing the components described above, such as transceiver module (226, 426, 728), demodulator (222, 422, 730), TX power control module (264, 446, 754), transmit power (248, 448, 758), power control module (214, 414, 714), and scale adjuster module (234, 434, 734).

As the UE 1334 moves from the illustrated location in cell 1304 into cell 1306, a serving cell change (SCC) or handover may occur in which communication with the UE 1334 transitions from the cell 1304, which may be referred to as the source cell, to cell 1306, which may be referred to as the target cell. Management of the handover procedure may take place at the UE 1334, at the Node Bs corresponding to the respective cells, at a radio network controller 1206 (see FIG. 12), or at another suitable node in the wireless network. For example, during a call with the source cell 1304, or at any other time, the UE 1334 may monitor various parameters of the source cell 1304 as well as various parameters of neighboring cells such as cells 1306 and 1302. Further, depending on the quality of these parameters, the UE 1334 may maintain communication with one or more of the neighboring cells. During this time, the UE 1334 may maintain an Active Set, that is, a list of cells that the UE 1334 is simultaneously connected to (i.e., the UTRA cells that are currently assigning a downlink dedicated physical channel DPCH or fractional downlink dedicated physical channel F-DPCH to the UE 1334 may constitute the Active Set).

The modulation and multiple access scheme employed by the access network 1300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), and Flash-OFDM employing OFDMA. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 14.

Figure 14:
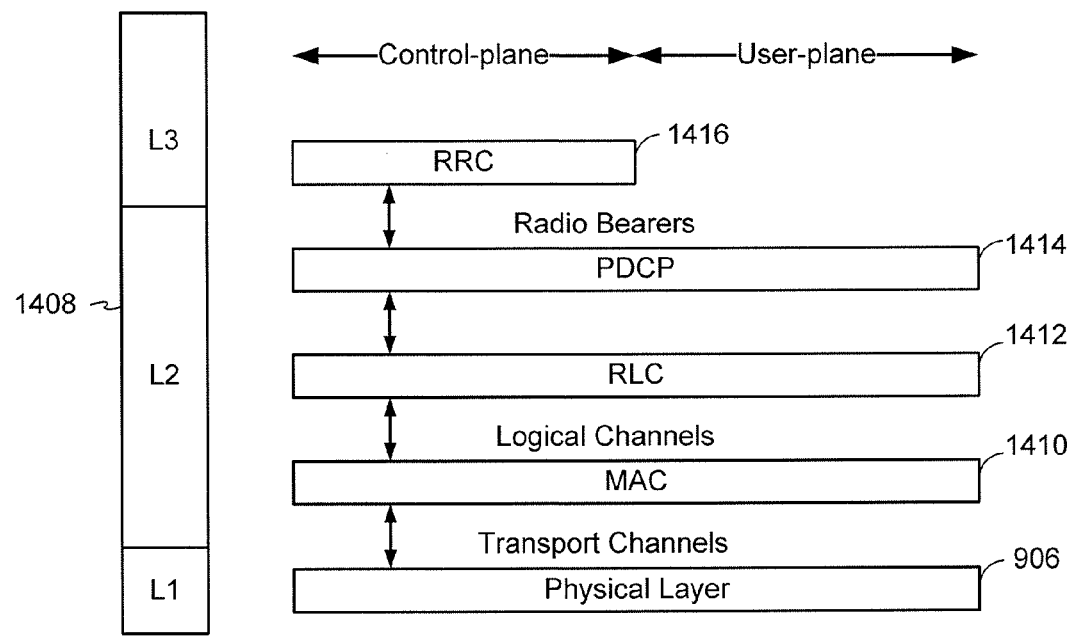
FIG. 14 is a conceptual diagram illustrating an example of a radio protocol architecture for the user and control planes for a base station and/or a UE configured to perform the functions described herein.

FIG. 14 is a conceptual diagram illustrating an example of the radio protocol architecture 1400 for the user plane and the control plane of a user equipment (UE) or node B/base station. For example, architecture 1400 may be included in a network entity and/or UE such as an entity within network 110 and/or UE 112 (FIG. 1, 2, 4 or 7). The radio protocol architecture 1400 for the UE and node B is shown with three layers 1408: Layer 1, Layer 2, and Layer 3. Layer 1 is the lowest lower and implements various physical layer signal processing functions. As such, Layer 1 includes the physical layer 1406. Layer 2 (L2 layer) is above the physical layer 1406 and is responsible for the link between the UE and node B over the physical layer 1406. Layer 3 (L3 layer) includes a radio resource control (RRC) sublayer 1416. The RRC sublayer 1416 handles the control plane signaling of Layer 3 between the UE and the UTRAN.

In the user plane, the L2 layer includes a media access control (MAC) sublayer 1410, a radio link control (RLC) sublayer 1412, and a packet data convergence protocol (PDCP) 1414 sublayer, which are terminated at the node B on the network side. Although not shown, the UE may have several upper layers above the L2 layer including a network layer (e.g., IP layer) that is terminated at a PDN gateway on the network side, and an application layer that is terminated at the other end of the connection (e.g., far end UE, server, etc.).

The PDCP sublayer 1414 provides multiplexing between different radio bearers and logical channels. The PDCP sublayer 1414 also provides header compression for upper layer data packets to reduce radio transmission overhead, security by ciphering the data packets, and handover support for UEs between node Bs. The RLC sublayer 1412 provides segmentation and reassembly of upper layer data packets, retransmission of lost data packets, and reordering of data packets to compensate for out-of-order reception due to hybrid automatic repeat request (HARQ). The MAC sublayer 1410 provides multiplexing between logical and transport channels. The MAC sublayer 1410 is also responsible for allocating the various radio resources (e.g., resource blocks) in one cell among the UEs. The MAC sublayer 1410 is also responsible for HARQ operations.

Figure 15:
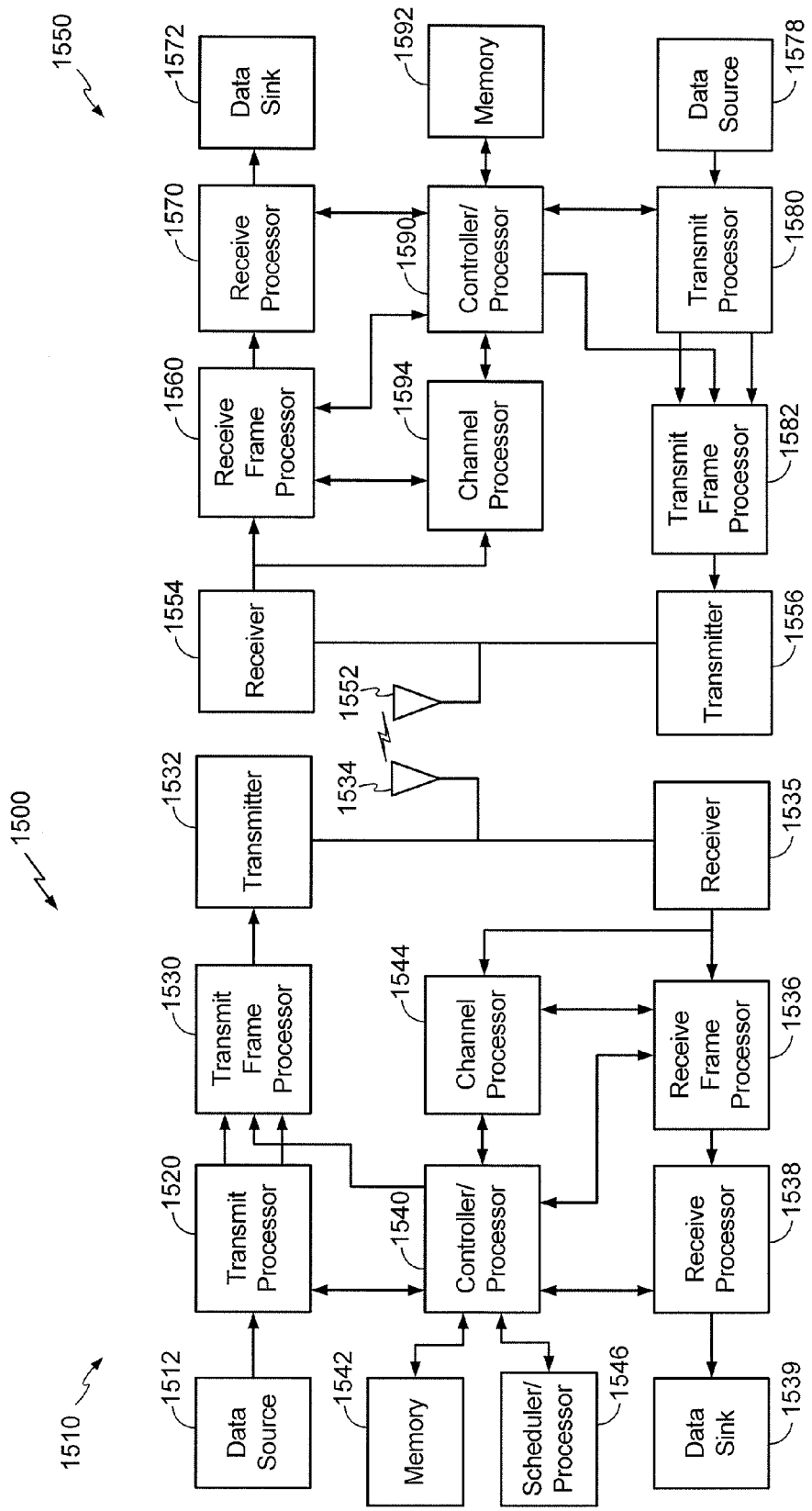
FIG. 15 is a block diagram conceptually illustrating an example of a Node B in communication with a UE in a telecommunications system configured to perform the functions described herein.

FIG. 15 is a block diagram of a communication system 1500 including a Node B 1515 in communication with a UE 1540, where Node B 1515 may be an entity within network 110 and the UE 1540 may be UE 112 according to the aspect described in FIG. 1, 2, 4 or 7. In the downlink communication, a transmit processor 1520 may receive data from a data source 1516 and control signals from a controller/processor 1540. The transmit processor 1520 provides various signal processing functions for the data and control signals, as well as reference signals (e.g., pilot signals). For example, the transmit processor 1520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1544 may be used by a controller/processor 1540 to determine the coding, modulation, spreading, and/or scrambling schemes for the transmit processor 1520. These channel estimates may be derived from a reference signal transmitted by the UE 1540 or from feedback from the UE 1540. The symbols generated by the transmit processor 1520 are provided to a transmit frame processor 1530 to create a frame structure. The transmit frame processor 1530 creates this frame structure by multiplexing the symbols with information from the controller/processor 1540, resulting in a series of frames. The frames are then provided to a transmitter 1532, which provides various signal conditioning functions including amplifying, filtering, and modulating the frames onto a carrier for downlink transmission over the wireless medium through antenna 1534. The antenna 1534 may include one or more antennas, for example, including beam steering bidirectional adaptive antenna arrays or other similar beam technologies.

At the UE 1540, a receiver 1544 receives the downlink transmission through an antenna 1542 and processes the transmission to recover the information modulated onto the carrier. The information recovered by the receiver 1544 is provided to a receive frame processor 1560, which parses each frame, and provides information from the frames to a channel processor 1594 and the data, control, and reference signals to a receive processor 1570. The receive processor 1570 then performs the inverse of the processing performed by the transmit processor 1520 in the Node B 1510. More specifically, the receive processor 1570 descrambles and despreads the symbols, and then determines the most likely signal constellation points transmitted by the Node B 1510 based on the modulation scheme. These soft decisions may be based on channel estimates computed by the channel processor 1594. The soft decisions are then decoded and deinterleaved to recover the data, control, and reference signals. The CRC codes are then checked to determine whether the frames were successfully decoded. The data carried by the successfully decoded frames will then be provided to a data sink 1572, which represents applications running in the UE 1540 and/or various user interfaces (e.g., display). Control signals carried by successfully decoded frames will be provided to a controller/processor 1590. When frames are unsuccessfully decoded by the receiver processor 1570, the controller/processor 1590 may also use an acknowledgement (ACK) and/or negative acknowledgement (NACK) protocol to support retransmission requests for those frames.

In the uplink, data from a data source 1578 and control signals from the controller/processor 1590 are provided to a transmit processor 1580. The data source 1578 may represent applications running in the UE 1540 and various user interfaces (e.g., keyboard). Similar to the functionality described in connection with the downlink transmission by the Node B 1510, the transmit processor 1580 provides various signal processing functions including CRC codes, coding and interleaving to facilitate FEC, mapping to signal constellations, spreading with OVSFs, and scrambling to produce a series of symbols. Channel estimates, derived by the channel processor 1594 from a reference signal transmitted by the Node B 1510 or from feedback contained in the midamble transmitted by the Node B 1510, may be used to select the appropriate coding, modulation, spreading, and/or scrambling schemes. The symbols produced by the transmit processor 1580 will be provided to a transmit frame processor 1582 to create a frame structure. The transmit frame processor 1582 creates this frame structure by multiplexing the symbols with information from the controller/processor 1590, resulting in a series of frames. The frames are then provided to a transmitter 1546, which provides various signal conditioning functions including amplification, filtering, and modulating the frames onto a carrier for uplink transmission over the wireless medium through the antenna 1542.

The uplink transmission is processed at the Node B 1510 in a manner similar to that described in connection with the receiver function at the UE 1540. A receiver 1534 receives the uplink transmission through the antenna 1534 and processes the transmission to recover the information modulated onto the carrier. The information recovered by the receiver 1534 is provided to a receive frame processor 1536, which parses each frame, and provides information from the frames to the channel processor 1544 and the data, control, and reference signals to a receive processor 1538. The receive processor 1538 performs the inverse of the processing performed by the transmit processor 1580 in the UE 1540. The data and control signals carried by the successfully decoded frames may then be provided to a data sink 1539 and the controller/processor, respectively. If some of the frames were unsuccessfully decoded by the receive processor, the controller/processor 1540 may also use an acknowledgement (ACK) and/or negative acknowledgement (NACK) protocol to support retransmission requests for those frames.

The controller/processors 1540 and 1590 may be used to direct the operation at the Node B 1510 and the UE 1540, respectively. For example, the controller/processors 1540 and 1590 may provide various functions including timing, peripheral interfaces, voltage regulation, power management, and other control functions. The computer readable media of memories 1542 and 1592 may store data and software for the Node B 1510 and the UE 1540, respectively. A scheduler/processor 1546 at the Node B 1510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.10 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" or processor (FIG. 10 or 11) that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106 (FIG. 11). The computer-readable medium 1106 (FIG. 11) may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 34 U.S.C. §112, sixth paragraph, unless the element is expressly recited using the phrase "means for" or, in the case of a method claim, the element is recited using the phrase "step for."

What is claimed is:

1. A method of transmit power control, comprising:
   receiving a downlink (DL) transmit power control (TPC) command on a Fractional-Dedicated Physical Channel (F-DPCH) from a serving base station and a non-serving base station;
   determining a scaling adjustment for a DLTPC rejection threshold for the non-serving base station based on a difference between a first DL signal-to-inference ratio (SIR) estimate of the non-serving base station and a second DL SIR estimate of the serving base station;
   adjusting the DLTPC rejection threshold for the non-serving base station based on the determined scaling adjustment; and
   rejecting or accepting the DLTPC command from the non-serving base station based on the adjusted DL TPC rejection threshold.

2. The method of claim 1, wherein determining the scaling adjustment for the DLTPC rejection threshold for the non-serving base station based on the difference of the second DL SIR estimate of the serving base station and the first DL SIR estimate of the non-serving base station includes:
   accessing a look-up table containing a plurality of scaling adjustments corresponding to a plurality of different DL SIR value differences; and
   selecting the scaling adjustment from the look-up table based on the difference between the second DL SIR estimate of the serving base station and the first DL SIR estimate of the non-serving base station.

3. The method of claim 1, wherein rejecting or accepting the DLTPC command from the non-serving base station based on the adjusted DLTPC rejection threshold further includes:
   comparing signal energy of the DLTPC command with the adjusted DLTPC rejection threshold; and
   rejecting the DLTPC command if the signal energy of the DLTPC command is below the adjusted DLTPC rejection threshold.

4. The method of claim 1, further comprising:
   combining multiple DLTPC commands from a serving base station and one or more non-serving base stations; and
   adjusting the transmit power according to the combined multiple DLTPC commands.

5. A method of transmit power control, comprising:
   receiving a downlink (DL) transmit power control (TPC) command on a Fractional-Dedicated Physical Channel (F-DPCH) from a serving base station;
   determining a scaling adjustment for a DLTPC rejection threshold for the serving base station based on a difference between channel conditions of multiple base stations including the serving station;
   adjusting the DLTPC rejection threshold for the serving base station based on the determined scaling adjustment;
   detecting an extreme channel condition for the F-DPCH from the serving base station, wherein detecting the extreme channel condition includes identifying a channel condition parameter and determining that the channel condition parameter meets a crisis mode threshold that is different from the adjusted DLTPC rejection threshold;

adjusting the scaling adjustment for the DLTPC rejection threshold for the serving base station based on detecting the extreme channel condition for the F-DPCH from the serving base station;

determining a crisis mode DLTPC rejection threshold by further adjusting the adjusted DLTPC rejection threshold for the serving base station based on the adjusted scaling adjustment; and rejecting or accepting the DLTPC command from the serving base station based on the crisis mode DLTPC rejection threshold.

6. The method of claim 5, wherein detecting the extreme channel condition comprises identifying the channel condition parameter where the serving base station cannot transmit with enough power for a received signal at a user equipment (UE) to meet a signal-interference ratio (SIR) target.

7. The method of claim 5, wherein identifying the channel condition parameter comprises identifying at least one of:
a parameter related to a number of positive or increase power indications in a plurality of uplink (UL) TPC commands transmitted by a user equipment (UE); and
a parameter related to a DL signal-interference ratio (SIR) corresponding to the F-DPCH received at the UE from the serving base station.

8. The method of claim 5, wherein determining the scaling adjustment for the DLTPC rejection threshold further comprises increasing the DLTPC rejection threshold based on at least one of:
a DL signal-interference ratio (SIR) corresponding to a signal received at a user equipment (UE) from the serving base station;
a difference between the DL SIR and a SIR target; and
a factor related to a number of positive or increase power indications in a plurality of uplink (UL) TPC commands transmitted by the UE.

9. The method of claim 5, wherein rejecting or accepting the DLTPC command from the base station based on the adjusted DLTPC rejection threshold further includes:
comparing signal energy of the DLTPC command with the crisis mode DLTPC rejection threshold; and
rejecting a negative DLTPC command if the signal energy of the DLTPC command does not meet the crisis mode DLTPC rejection threshold.

10. An apparatus of wireless communication, comprising:
at least one processor; and
a memory coupled to the at least one processor, wherein the at least one processor is configured to:
receive a downlink (DL) transmit power control (TPC) command on a Fractional-Dedicated Physical Channel (F-DPCH) from a serving base station and a non-serving base station;
determine a scaling adjustment for a DLTPC rejection threshold for the non-serving base station based on a difference between a first DL signal-to-inference ratio (SIR) estimate of the non-serving base station and a second DL SIR estimate of the serving base station;
adjust the DLTPC rejection threshold for the non-serving base station based on the determined scaling adjustment; and
reject or accept the DLTPC command from the non-serving base station based on the adjusted DL TPC rejection threshold.

11. The apparatus of claim 10, wherein the at least one processor configured to determine the scaling adjustment for the DLTPC rejection threshold for the non-serving base station based on the difference of the second DL SIR estimate of the serving base station and the first DL SIR estimate of the non-serving base station includes:
accessing a look-up table containing a plurality of scaling adjustments corresponding to a plurality of different DL SIR value differences; and
selecting the scaling adjustment from the look-up table based on the difference between the second DL SIR estimate of the serving base station and the first DL SIR estimate of the non-serving base station.

12. The apparatus of claim 10, wherein the at least one processor configured to reject or accept the DLTPC command from the non-serving base station based on the adjusted DLTPC rejection threshold is further configured to:
compare signal energy of the DLTPC command with the adjusted DLTPC rejection threshold; and
reject the DLTPC command if the signal energy of the DLTPC command is below the adjusted DLTPC rejection threshold.

13. The apparatus of claim 10, wherein the at least one processor is further configured to:
combine multiple DLTPC commands from a serving base station and one or more non-serving base stations; and
adjust the transmit power according to the combined multiple DLTPC commands.

14. An apparatus of wireless communication, comprising:
at least one processor; and
a memory coupled to the at least one processor, wherein the at least one processor is configured to:
receive a downlink (DL) transmit power control (TPC) command on a Fractional-Dedicated Physical Channel (F-DPCH) from a serving base station;
determine a scaling adjustment for a DLTPC rejection threshold for the serving base station based on a difference between channel conditions of multiple base stations including the serving station;
adjust the DLTPC rejection threshold for the serving base station based on the determined scaling adjustment;
detect an extreme channel condition for the F-DPCH from the serving base station, wherein detecting the extreme channel condition includes identifying a channel condition parameter and determining that the channel condition parameter meets a crisis mode threshold that is different from the adjusted DLTPC rejection threshold;
adjust the scaling adjustment for the DLTPC rejection threshold for the serving base station based on detecting the extreme channel condition for the F-DPCH from the serving base station;
determine a crisis mode DLTPC rejection threshold by further adjusting the adjusted DLTPC rejection threshold for the serving base station based on the adjusted scaling adjustment; and
reject or accept the DLTPC command from the serving base station based on the crisis mode DLTPC rejection threshold.

15. The apparatus of claim 14, wherein the at least one processor configured to detect the extreme channel condition is further configured to identify the channel condition parameter where the serving base station cannot transmit with enough power for a received signal at a user equipment (UE) to meet a signal-interference ratio (SIR) target.

16. The apparatus of claim 14, wherein the at least one processor configured to identify the channel condition parameter is further configured to identify at least one of:

a parameter related to a number of positive or increase power indications in a plurality of uplink (UL) TPC commands transmitted by a user equipment (UE); and a parameter related to a DL signal-interference ratio (SIR) corresponding to the F-DPCH received at the UE from the serving base station.

17. The apparatus of claim 14, wherein the at least one processor configured to determine the scaling adjustment for the DLTPC rejection threshold is further configured to increase the DLTPC rejection threshold based on at least one of:

a DL signal-interference ratio (SIR) corresponding to a signal received at a user equipment (UE) from the serving base station;

a difference between the DL SIR and a SIR target; and a factor related to a number of positive or increase power indications in a plurality of uplink (UL) TPC commands transmitted by the UE.

18. The apparatus of claim 14, wherein the at least one processor configured to reject or accept the DLTPC command from the base station based on the adjusted DLTPC rejection threshold is further configured to:

compare signal energy of the DLTPC command with the crisis mode DLTPC rejection threshold; and reject a negative DLTPC command if the signal energy of the DLTPC command does not meet the crisis mode DLTPC rejection threshold.

19. An apparatus of wireless communication, comprising:

means for receiving a downlink (DL) transmit power control (TPC) command on a Fractional-Dedicated Physical Channel (F-DPCH) from a serving base station and a non-serving base station;

means for determining a scaling adjustment for a DLTPC rejection threshold for the non-serving base station based on a difference between—a first DL signal-to-interference ratio (SIR) estimate of the non-serving base station and a second DL SIR estimate of the serving base station;

means for adjusting the DLTPC rejection threshold for the non-serving base station based on the determined scaling adjustment; and means for rejecting or accepting the DLTPC command from the non-serving base station based on the adjusted DL TPC rejection threshold.

20. A non-transitory computer readable medium storing computer executable code for transmit power control, comprising:

code for receiving a downlink (DL) transmit power control (TPC) command on a Fractional-Dedicated Physical Channel (F-DPCH) from a serving base station and a non-serving base station;

code for determining a scaling adjustment for a DLTPC rejection threshold for the non-serving base station based on a difference between a first DL signal-to-interference ratio (SIR) estimate of the non-serving base station and a second DL SIR estimate of the serving base station;

code for adjusting the DLTPC rejection threshold for the non-serving base station based on the determined scaling adjustment; and code for rejecting or accepting the DLTPC command from the non-serving base station based on the adjusted DL TPC rejection threshold.

* * * * *